United States Patent
Yamagajo et al.

(10) Patent No.: US 9,600,605 B2
(45) Date of Patent: Mar. 21, 2017

(54) ANTENNA DESIGN METHOD AND APPARATUS

(71) Applicant: FUJITSU LIMITED, Kawasaki-shi, Kanagawa (JP)

(72) Inventors: Takashi Yamagajo, Yokosuka (JP); Tabito Tonooka, Kawasaki (JP); Kai Nojima, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 796 days.

(21) Appl. No.: 14/016,891

(22) Filed: Sep. 3, 2013

(65) Prior Publication Data
US 2014/0074440 A1    Mar. 13, 2014

(30) Foreign Application Priority Data

Sep. 10, 2012 (JP) ................. 2012-198958

(51) Int. Cl.
  *G06F 17/50* (2006.01)
  *H01Q 1/24* (2006.01)
  (Continued)

(52) U.S. Cl.
  CPC .......... *G06F 17/50* (2013.01); *G06F 17/5045* (2013.01); *G06F 17/5063* (2013.01);
  (Continued)

(58) Field of Classification Search
  CPC .. G06F 17/50; G06F 17/5063; G06F 17/5045; G06F 2217/82; H01Q 21/28; H01Q 1/243; H03H 7/38
  (Continued)

(56) References Cited

U.S. PATENT DOCUMENTS 4,968,983 A * 11/1990 Maeda ............... G01R 29/0878
                                                      342/360
2005/0107042 A1    5/2005 De Graauw
(Continued)

FOREIGN PATENT DOCUMENTS

JP    1-271879    10/1989
JP    6-231197    8/1994
(Continued)

OTHER PUBLICATIONS

A. Ametani, N. Nagaoka, T. Noda, T. Matsuura, "A Simple and Efficient Method for Including a Frequency-Dependent Effect in a Transmission Line Transient Analysis" International Conference on Power Systems Transients, Sep. 1995, pp. 11-16.*
(Continued)

*Primary Examiner* — Dwin M Craig
(74) *Attorney, Agent, or Firm* — Fujitsu Patent Center

(57) ABSTRACT

An antenna design method executed by a computer includes creating an antenna model including an antenna which includes a plurality of antenna elements and matching circuits which are respectively connected to the plurality of antenna elements and which comprise a matching element including a parasitic reactance and a loss resistance; obtaining a characteristic of the antenna and a characteristic of the matching element; calculating a characteristic of the created antenna model using the obtained characteristic of the antenna and the characteristic of the matching element; judging whether or not the calculated characteristic of the antenna model satisfies a standard value; and displaying result of the judgment.

12 Claims, 27 Drawing Sheets

(51) Int. Cl.
*H01Q 21/28* (2006.01)
*H03H 7/38* (2006.01)

(52) U.S. Cl.
CPC ............. *H01Q 1/243* (2013.01); *H01Q 21/28* (2013.01); *G06F 2217/82* (2013.01); *H03H 7/38* (2013.01)

(58) Field of Classification Search
USPC .......................................................... 703/1
See application file for complete search history.

(56) References Cited

U.S. PATENT DOCUMENTS

| | | | |
|---|---|---|---|
| 2008/0258993 A1* | 10/2008 | Gummalla | H01Q 1/243 343/876 |
| 2009/0164954 A1* | 6/2009 | Yamagajo | H01Q 1/2208 716/132 |
| 2010/0060530 A1 | 3/2010 | Shoji | |

FOREIGN PATENT DOCUMENTS

| | | |
|---|---|---|
| JP | 2004-104751 | 4/2004 |
| JP | 2005-516525 | 6/2005 |
| JP | 2008-306552 | 12/2008 |
| JP | 2010-062976 | 3/2010 |

OTHER PUBLICATIONS

Ping Jen, Richard W. Ziolkowski, "Broadband, Efficient, Electrically Small Metamaterial-Inspired Antennas Facilitated by Active Near-Field Resonant Parasitic Element" IEEE Transactions on Antennas and Propagation, vol. 58, No. 2 Feb. 2010, pp. 318-327.*
JPOA—Office Action dated May 10, 2016 for corresponding Japanese patent application No. 2012-198958, with English translation of the relevant part, p. 1 line 18—p. 3, line 10 of the Office Action.
Hiroshi Sato et al., "A Method of Dual-Frequency Decoupling for Closely Spaced Two Small Antennas", IEICE (The Institute of Electronics, Information and Communication Engineers) Journal B, Sep. 1, 2011, vol. J94-B, No. 9, pp. 1104-1113.
Shin-Chang Chen et al., "A Decoupling Technique for Increasing the Port Isolation Between Two Strongly Coupled Antennas", IEEE Transactions on Antennas and Propagation, Dec. 2008, vol. 56, No. 12, pp. 3650-3658.
The Extended European Search Report (EESR) dated Nov. 23, 2015 for corresponding European Patent Application No. 13182670.3.
Kristian Karlsson,"Embedded Element Patterns in Combination with Circuit Simulations for Multi-Port Antenna Analysis—phD Thesis" In: "Embedded Element Patterns in Combination with Circuit Simulations for Multi-Port Antenna Analysis—phD Thesis", Jan. 1, 2009, Gothenburgh, Sweden, pp. 1-218, XP055226415, ISBN: 978-91-7-385305-7.
Mona Hashemi, "Designing Feeding Network for Multi-band MIMO Antenna—Master Thesis", Jan. 1, 2010, Gothenburg, Sweden, pp. 1-50, XP055226392, Retrieved from the Internet: URL: http://publications.lib.chalmers.se/records/fulltext/130329.pdf.
Goldfarb Marc E et al.,"Modeling via hole grounds in microstrip", IEEE Microwave and Guided Wave Letters, IEEE Inc, New York, US, vol. 1, No. 6, Jun. 1, 1991, pp. 135-137, XP011419942, ISSN: 1051-8207, DOI: 10.1109/75.91090.
Optenni Ltd, "Easy-to-use component library and fast tolerance analysis in Optenni Lab", Jan. 25, 2012, Espoo, Finland, pp. 1-2, XP055226467, Retrieved from the Internet: URL: https://www.optenni.com/images/stories/optennilab/Optenni_Murata_press_release_2012_01_25.pdf.
Optenni Ltd, "Demonstration of Matching Circuit Optimization in Optenni Lab", Jan. 29, 2012, p. 1, XP054976197, Retrieved from the Internet: URL: https://www.youtube.com/watch?feature=player_embedded&v=KebC6Wp0Uo4.
Jussi Rahola, "Advances in impedance matching tools for antenna applications", Antennas and Propagation Society International Symposium (APSURSI), 2012 IEEE, IEEE, Jul. 8, 2012, pp. 1-2, XP032471875, DOI: 10.1109/APS.2012.6348855, ISBN: 978-1-4673-0461-0.
Otto S et al., "Array and Multiport Antenna Farfield Simulation using Empire, Matlab and ADS", Microwave Conference, 2009. EUMC 2009. European, IEEE, Piscataway, NJ, USA, Sep. 29, 2009, pp. 1547-1550, XP031670295, ISBN: 978-1-4244-4748-0.
EPOA—Office Action dated Oct. 6, 2016 issued for corresponding European Patent Application No. 13182670.3.
JPOA—Office Action dated Oct. 18, 2016 for corresponding Japanese Patent Application No. 2012-198958, with English Translation of the relevant parts, p. 1, line 19—p. 3, line 2 and p. 3, lines 8-21, of the Office Action.

\* cited by examiner

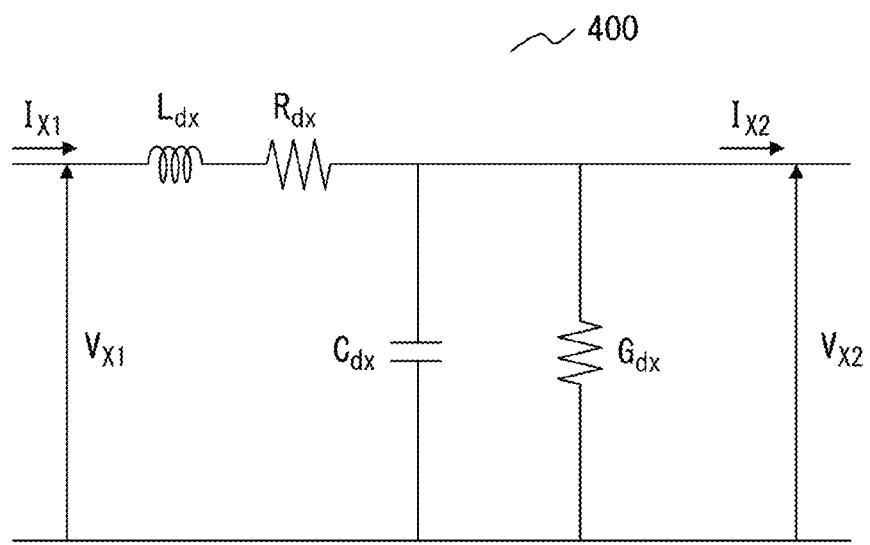
F I G. 5

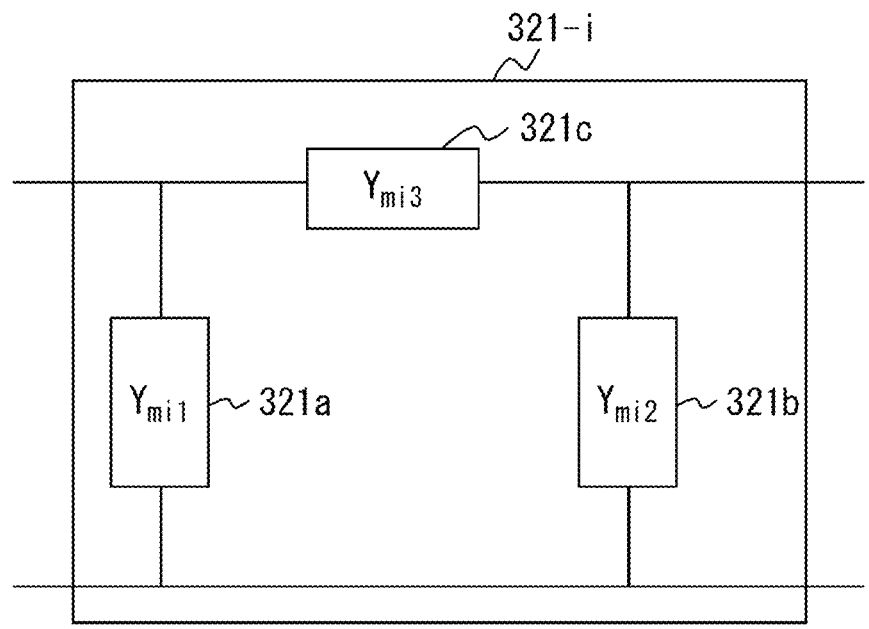
F I G. 6

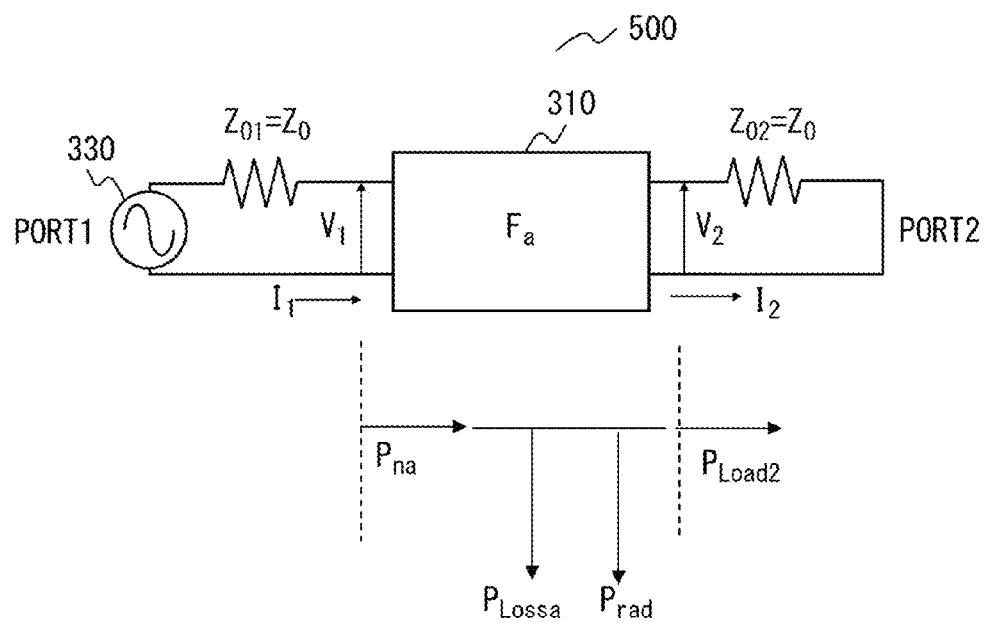
F I G. 7

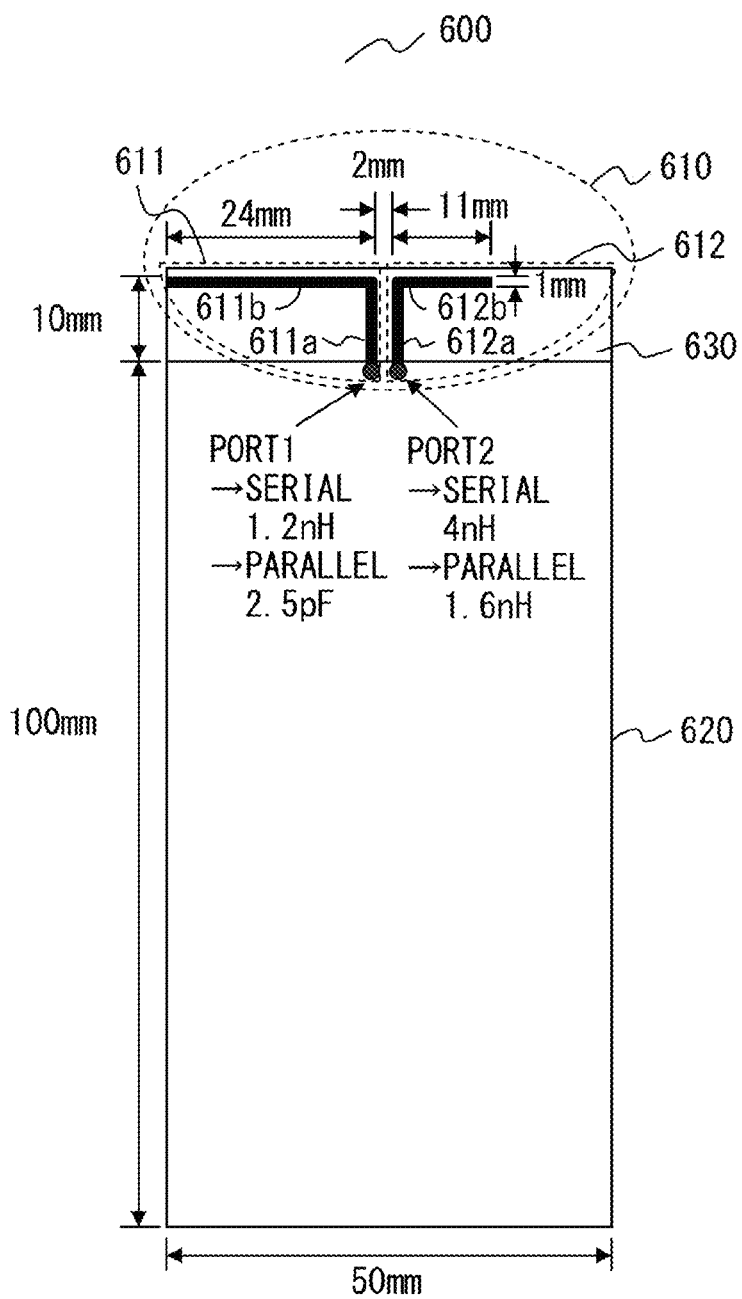
F I G. 8

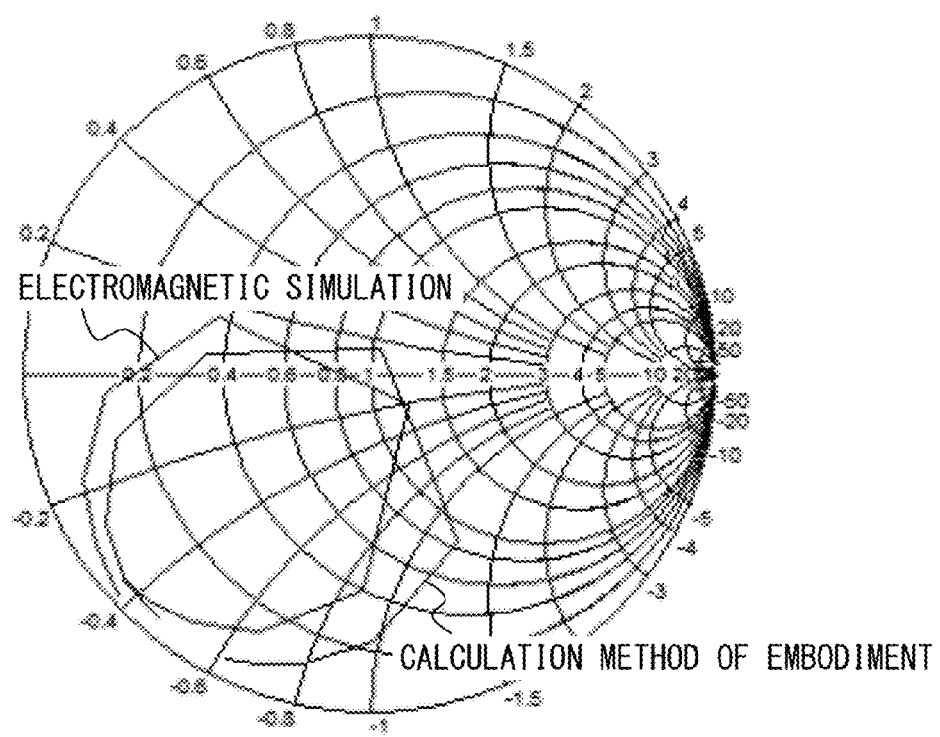
F I G. 11

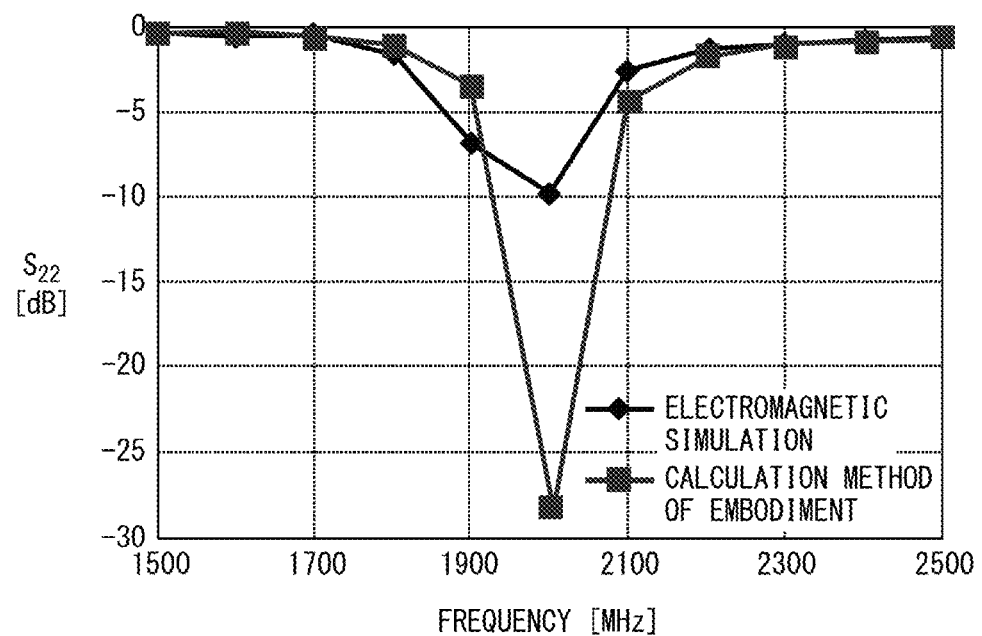
F I G. 1 2

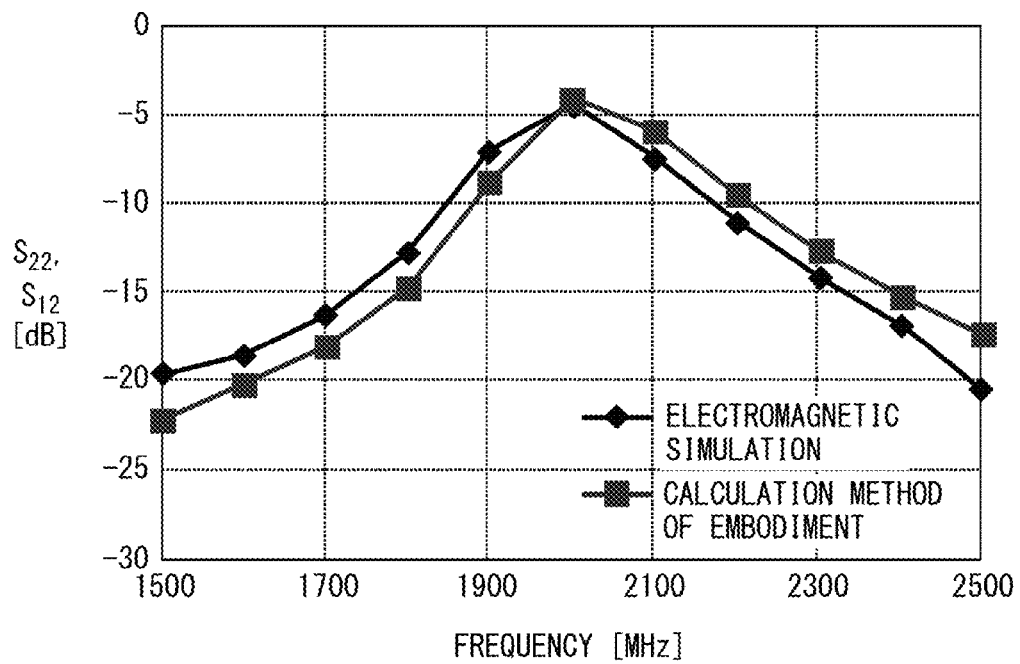
F I G. 14

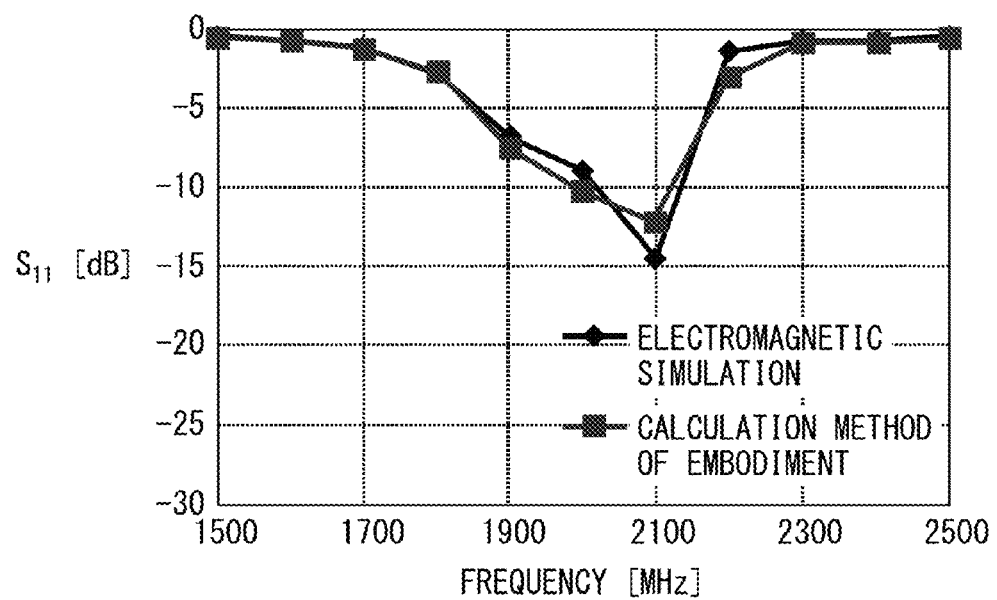
F I G. 1 9

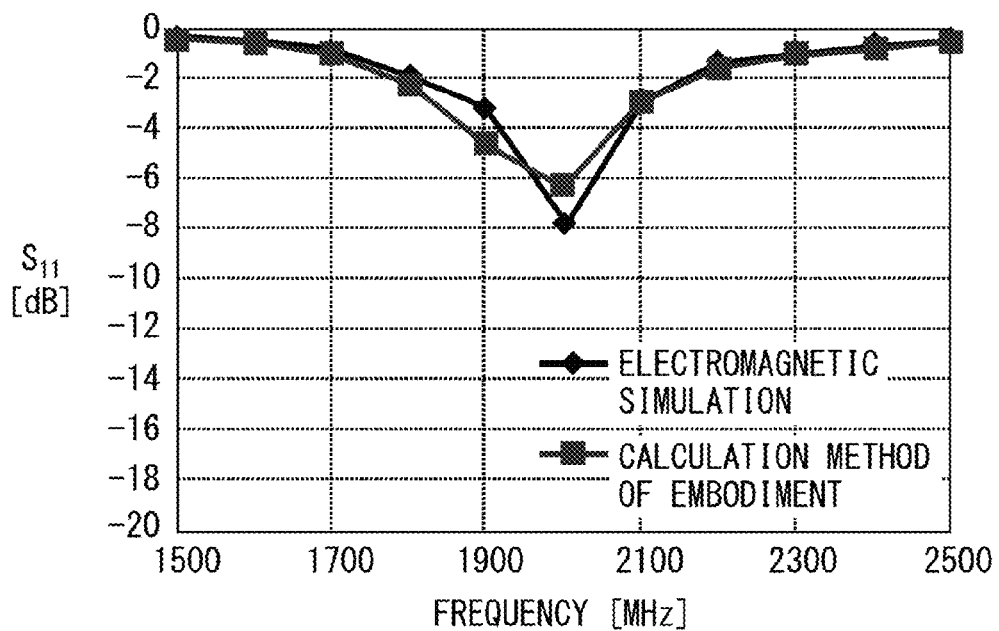
F I G. 2 1

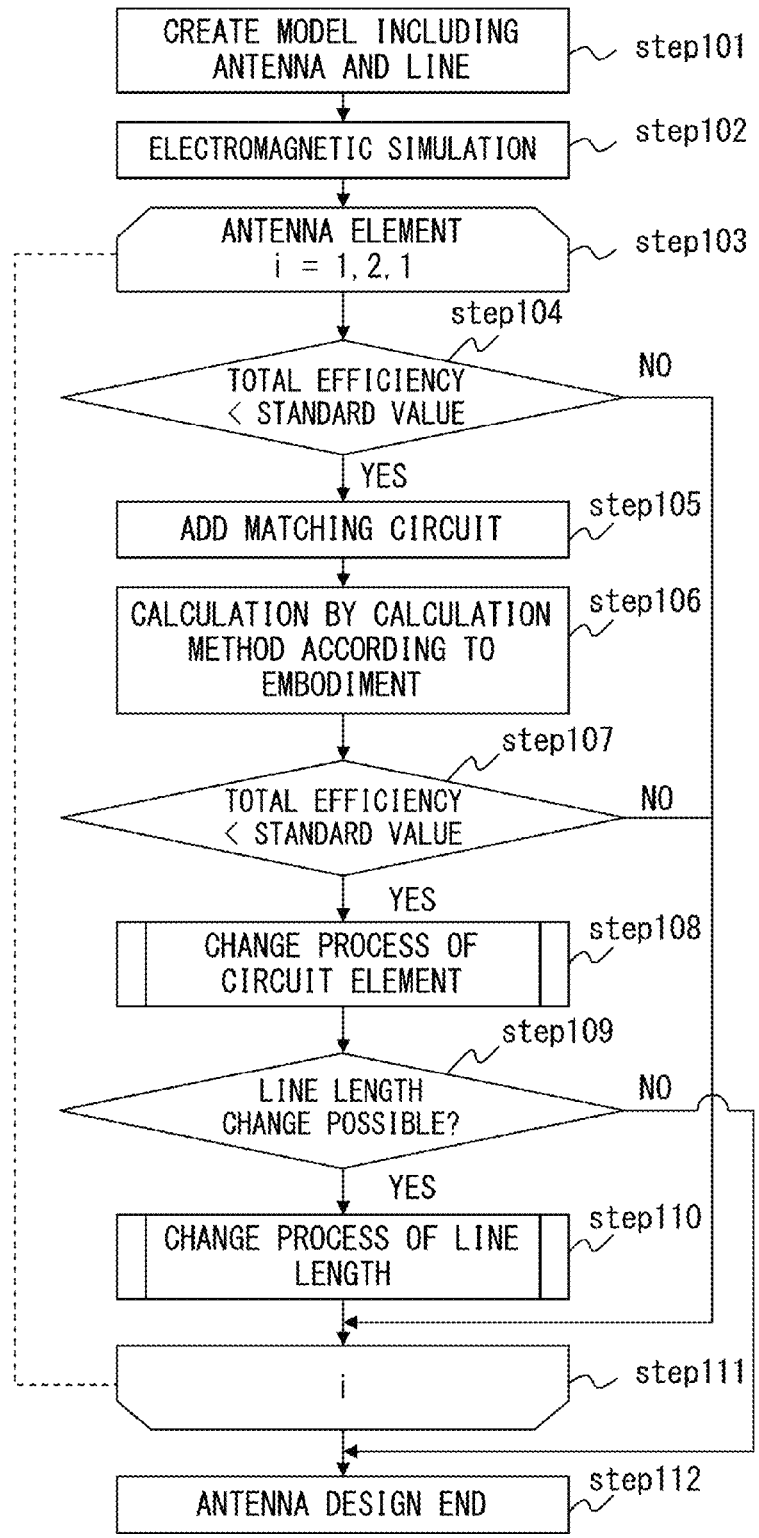
F I G. 23

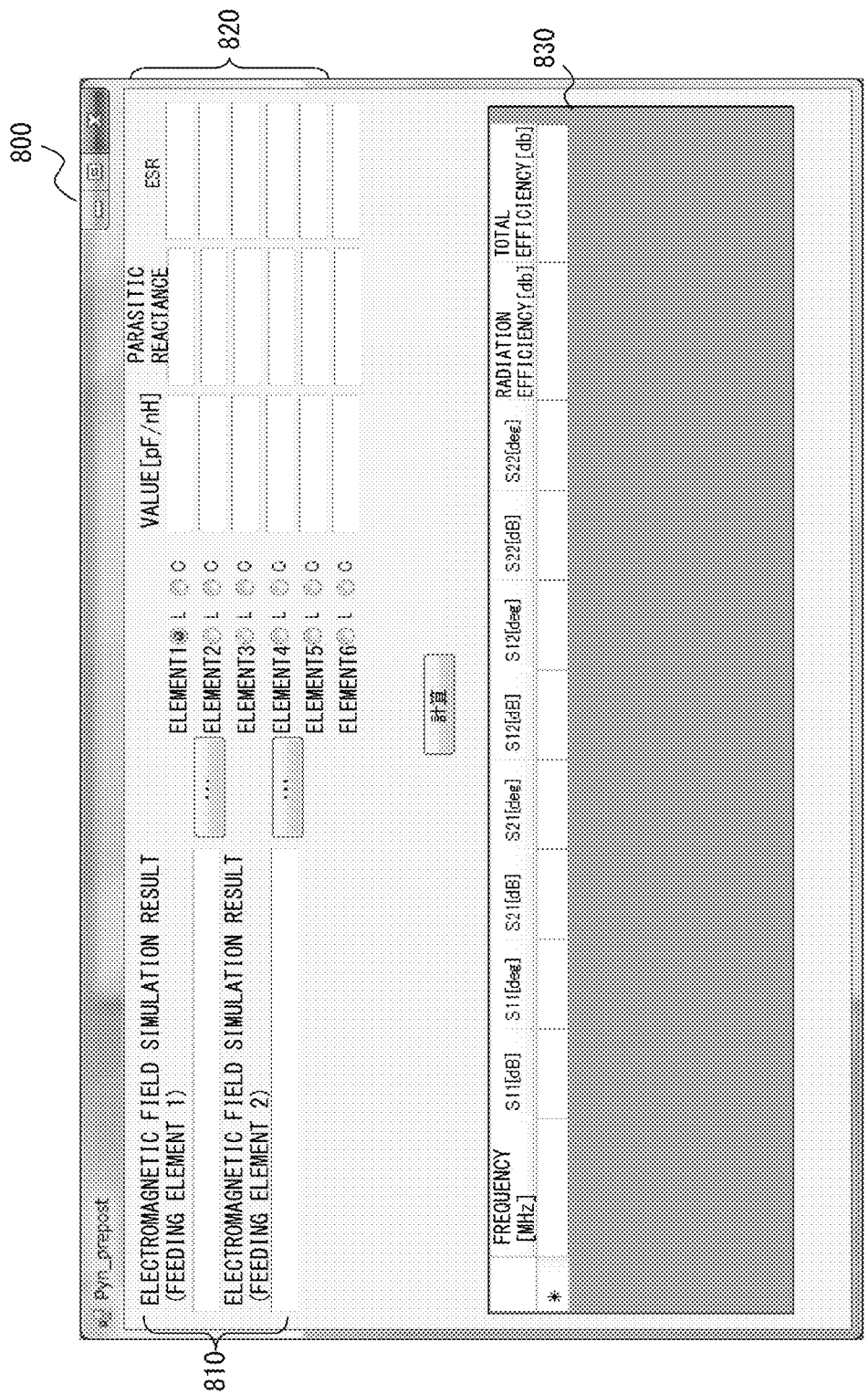
F I G. 24

ANTENNA DESIGN METHOD AND APPARATUS

CROSS-REFERENCE TO RELATED APPLICATIONS

This application is based upon and claims the benefit of priority of the prior Japanese Patent Application No. 2012-198958, filed on Sep. 10, 2012, the entire contents of which are incorporated herein by reference.

FIELD

The present invention relates to an antenna design method, an antenna design apparatus, and an antenna design program.

BACKGROUND

There is a wireless communication technique that improves the communication quality by using an antenna including a plurality of antenna elements for a transmitting and receiving antenna mounted on a communication apparatus such as a mobile information terminal apparatus. Multiple-input Multiple-output (MIMO) is an example of such a wireless technique.

An antenna including a plurality of antenna elements is designed by an antenna design method such as the one below, for example.

First, the designer creates a model of the antenna including a plurality of antenna elements alone.

The designer obtains the antenna characteristic of the created antenna-alone model by a simulation using an electromagnetic field simulator. The antenna characteristic to be obtained includes the antenna impedance, radiation efficiency, and total efficiency, and the like.

Next, the designer creates the models of matching circuits which are to be connected to the plurality of the antenna elements, respectively, with reference to the obtained characteristic of the antenna-alone model. Then, the designer adds the respective created models of matching circuits to the antenna-alone model, and obtains the antenna characteristic of the model to which the matching circuits have been added, using the electromagnetic field simulator.

The designer evaluates whether or not the obtained antenna characteristic satisfies a desired standard. When the antenna characteristic of the antenna model to which the matching circuits have been added satisfies the desired standard according to the evaluation, the designer finishes the antenna design. On the other hand, when the antenna characteristic does not satisfy the desired standard according to the evaluation, the designer creates the respective models of matching circuits to be connected to the plurality of antenna elements again, and continues the antenna design.

Meanwhile, there is a conventional technique to measure the radiation characteristic of a patch antennal using a prescribed parameter including the electric conductivity of the transparent conductive film to be the radiation element and the electric conductivity of the microstrip line.

There is a conventional technique to measure the radiation efficiency of the matching element and the antenna of the transmitting and/or receiving module.

There is a conventional technique to obtain the relationship between the frequency and the return loss and the relationship between the frequency and the antenna efficiency about a notch antenna including a reactance circuit by an electromagnetic field simulation such as the Finite Difference Time Domain Method (FDTD).

In recent years, mobile information terminal apparatus has been becoming smaller and thinner, and the mounting space of the antenna provided in the mobile information terminal apparatus has been becoming smaller and thinner as well. In the smaller and thinner mobile information terminal apparatus, the antenna and peripheral parts composed of metal may be close in the structure. When there is metal near the antenna, an electric current that cancels out the antenna current flows into the metal, which lead to the deterioration of the antenna performance.

The performance index includes radiation resistance $R_r$. Assuming the loss resistance included in the antenna and the matching circuit and the like as $R_l$, radiation efficiency $\eta$ which is the ratio of the net electric power added to the antenna to the electric power radiated from the antenna is expressed by expression (1) below.

$$\eta = \frac{R_r}{R_r + R_l} \qquad (1)$$

As is apparent from expression (1), when radiation resistance $R_r$ of the antenna is small, radiation efficiency $\eta$ deteriorates to a large extent even if loss resistance $R_l$ is a little value. Therefore, it is desirable to design the antenna so that radiation resistance $R_r$ becomes large.

However, in the smaller and thinner mobile information terminal apparatus, metal may be present near the antenna as described above, and it may become a structure which is difficult to radiate electric wave, that is, a structure in which radiation resistance $R_r$ is small. Therefore, in designing an antenna in the structure in which radiation resistance $R_r$ is small, there is a need to pay attention to loss resistance $R_l$ even if it is a small value.

When the input impedance of the antenna deviates from the characteristic impedance (for example, 50Ω), it is needed to match by a matching circuit. Matching elements that constitute the matching circuit include a capacitance component or an inductance component, and a parasitic inductance component or a parasitic capacitance component, as well as a resistance component though it is a little. Therefore, in designing an antenna having a structure in which radiation resistance $R_r$ is small, there is a need to pay attention to the resistance component of each matching element that constitute the matching circuit.

In addition, when the antenna including a plurality of antennas as described above is mounted on the smaller and thinner mobile information terminal apparatus, the allocated gap between antenna elements becomes small, and electromagnetic coupling may be generated between the antenna elements. When electromagnetic coupling is generated between the antenna elements, it leads to the deterioration of the antenna characteristic such as a decrease in the radiation efficiency. Therefore, when the antenna for a design target includes a plurality of antenna elements, there is a need to design the antenna in consideration of an interaction generated between the antenna elements such as the isolation characteristic between the antenna elements.

However, by the conventional antenna design method described above, it is impossible to design the antenna in a speedy and efficient manner in view of the interaction between the antenna elements and the loss in the matching circuit connected to the individual antenna element.

That is, in the conventional antenna design method, the antenna characteristic of the antenna model including the matching circuits which are connected to the plurality of antenna elements, respectively, are obtained by a simulation. For this reason, in the conventional antenna design method, it requires a huge amount of time to calculate the antenna characteristic in view of the interaction between the antenna elements and the loss in the matching circuit. Therefore, by the conventional antenna design method, it is impossible to design the antenna that satisfies the desired standard, in a speedy manner.

In addition, in the conventional antenna design method described above, the designer evaluates whether or not the simulation result matches the desired standard, and the designer needs to reconsider the configuration of the matching circuit based on the evaluation result. For this reason, it is impossible to design the antenna in a speedy and efficient manner in view of the interaction between the antenna elements and the loss in the matching circuit.

PRIOR ART DOCUMENTS

Patent Documents

[Patent Document 1] Japanese Laid-open Patent Publication No. 2008-306552
[Patent Document 2] Japanese National Publication of International Patent Application No. 2005-516525
[Patent Document 3] Japanese Laid-open Patent Publication No. 2010-62976

SUMMARY

According to an aspect of the embodiment, an antenna design method executed by a computer includes creating an antenna model including an antenna which includes a plurality of antenna elements and matching circuits which are respectively connected to the plurality of antenna elements and which comprise a matching element including a parasitic reactance and a loss resistance; obtaining a characteristic of the antenna and a characteristic of the matching element; calculating a characteristic of the created antenna model using the obtained characteristic of the antenna and the characteristic of the matching element; judging whether or not the calculated characteristic of the antenna model satisfies a standard value; and displaying result of the judgment.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an exemplary equivalent circuit diagram of the first and second lines;
FIG. 6 illustrates an example diagram of the first and second matching circuits;
FIG. 7 illustrates an exemplary antenna-alone model;
FIG. 8 illustrates an explanatory diagram of an antenna model with a matching circuit used to test the calculation accuracy;
FIG. 11 illustrates a Smith chart of $S_{11}$ in the first test example;
FIG. 12 illustrates a frequency characteristic diagram of $S_{22}$ in the first test example;
FIG. 14 illustrates a frequency characteristic diagram of $S_{21}$ and $S_{12}$ in the first test example;
FIG. 19 illustrates a frequency characteristic diagram of $S_{11}$ in a case in which reference impedance $Z_{02}$ of the second port is 0;
FIG. 21 illustrates a frequency characteristic diagram of $S_{11}$ in a case in which reference impedance $Z_{02}$ of the second port is infinite;
FIG. 23 illustrates an example diagram of an antenna design process flow according to an embodiment;
FIG. 24 illustrates an example of a display screen of a design tool of an antenna model with a matching circuit.

DESCRIPTION OF EMBODIMENTS

Hereinafter, embodiments are explained with reference to the drawings.

Figure 1:
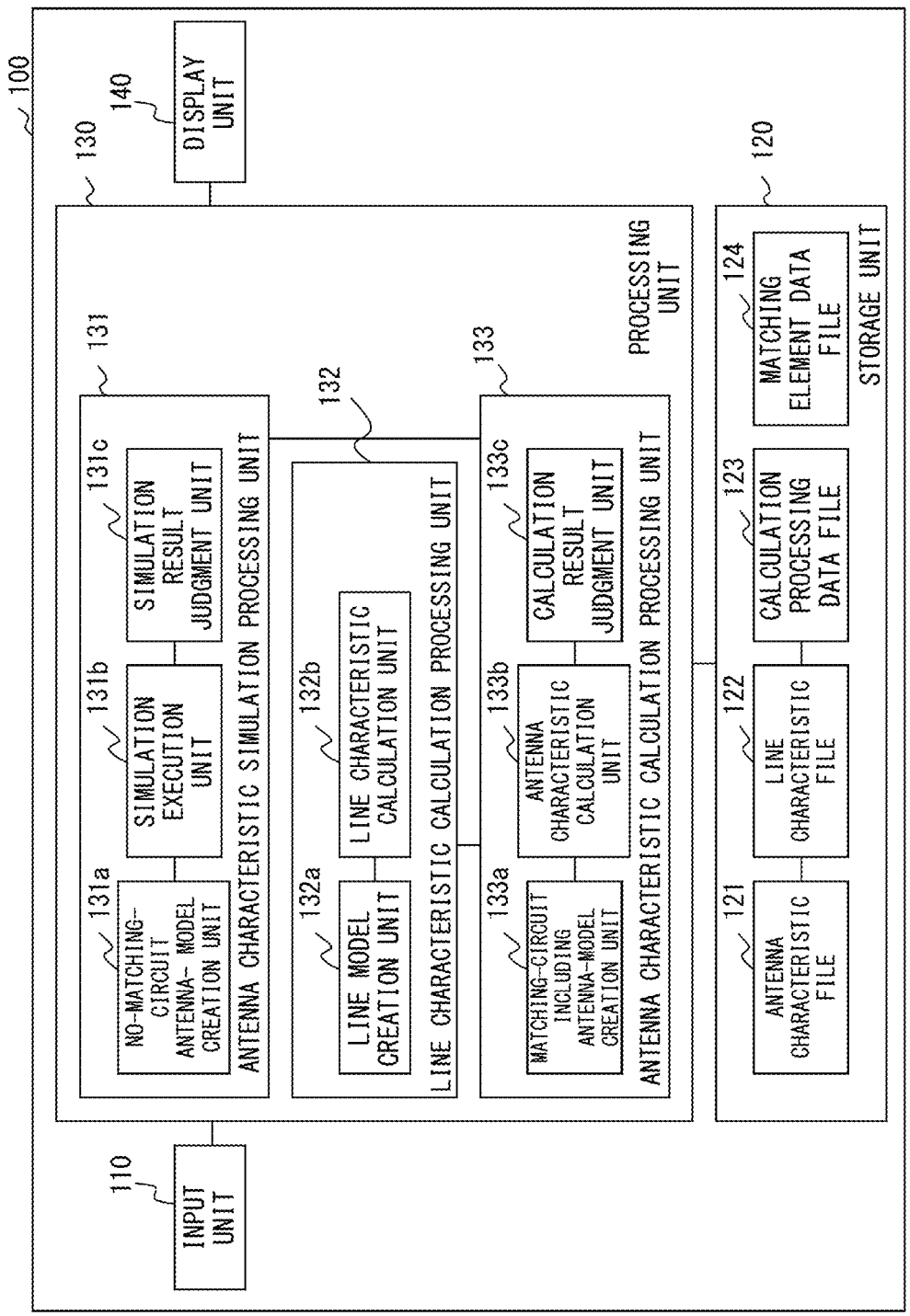
FIG. 1 illustrates a functional configuration diagram of an antenna design apparatus according to an embodiment.

FIG. 1 illustrates a functional configuration diagram of an antenna design apparatus according to an embodiment.

An antenna design apparatus 100 is an apparatus that executes antenna design in view of the interaction between the antenna elements and the loss in the matching element.

As described later, when executing antenna design in view of the interaction between the antenna elements and the loss in the matching element, the antenna design apparatus 100 calculates the antenna characteristic of the model including the antenna and the matching circuit by an analytical method according to the embodiment.

Meanwhile, in some embodiments, the antenna design apparatus 100 executes antenna design in view of the loss in the feed line between the antenna element and the wave source (signal source), in addition to the interaction between the antenna elements and the loss in the matching element.

In the line that connects the antenna element and a transmitting/receiving module being the wave source, a loss may be included. For example, when the mobile information terminal apparatus becomes thinner, the thickness of the line may also become thinner. Since the loss in the line increases as the thickness of the line becomes thinner, radiation efficiency $\eta$ of the antenna may be affected by the loss in the line and deteriorate. Therefore, depending on the thickness of the feed line planned to be connected to the antenna, antenna design need to be executed in consideration of the loss in the line.

As described later, when executing antenna design in view of the loss in the line in addition to the interaction between the antenna elements and the loss in the matching element, the antenna design apparatus 100 calculates the antenna characteristic of the model including the antenna, the matching circuit, and the line by an analytical method according to the embodiment.

The antenna design apparatus 100 includes an input unit 110, a storage unit 120, a processing unit 130, and a display unit 140.

The input unit 110 is an apparatus to input various data required for antenna design. The input unit 110 is, for example, a keyboard, and mouse, and the like.

Various data input via the input unit 110 includes data about the shape of the model, the material of the model, the wave source, the circuit parts, the analysis conditions, and the analysis output items.

Data about the material of the model is data about the conductivity, permittivity, permeability and various losses and the like. Data about the analysis conditions are data, for example, about the upper limit and the lower limit of the frequencies to be analyzed, the increments of the frequency, and the presence/absence of the high-speed process setting and the like. Data about the analysis output items are, for example, data about the Scattering parameter (S parameter), the radiation efficiency, and the total efficiency. In addition, in the data about the analysis output items, the antenna impedance and the impedance of the matching element may also be included, and in some embodiments, the characteristic impedance and the transfer coefficient of the line may be included.

Meanwhile, the radiation efficiency is, in a model including the antenna and the matching circuit, the ratio of the net electric power entering the antenna (fed antenna element) at the insertion position of the matching circuit at the wave source side to the radiation power from the antenna. In addition, in the model including the antenna, the matching circuit and the line, the radiation efficiency is the ratio of the net electric power entering the antenna (fed antenna element) at the insertion position of line at the wave source side to the radiation power from the antenna. In the antenna-alone model that does not include the line and the matching circuit, the radiation efficiency is the net power entering the antenna (fed antenna element) to the radiation power from the antenna.

In addition, the total efficiency refers to the ratio of the total input power from the wave source to the radiation power from the antenna (fed antenna element).

The storage unit 120 is a storage apparatus including an antenna characteristic file 121 and a calculation processing data file 123 in which processing data by the processing unit 130 are stored.

In the embodiment in which the antenna design apparatus 100 executes antenna design in view of the loss in the line as well, the storage unit 120 may further include a line characteristic file 122.

In addition, in some embodiments, the storage unit 120 further includes a matching element data file 124. The matching element data file 124 stores, for example, various data of matching elements that are commercially available from circuit parts manufacturers and the like. Examples of various data of the matching element to be stored include the type of the matching element, the capacitance or the inductance of the matching element, the size of the matching element, the parasitic inductance or the parasitic capacitance, the loss resistance, the withstanding pressure, and the price and the like.

The storage unit 120 is a Read Only Memory (ROM), a Random Access Memory (RAM), and a hard disk drive (HDD) and the like.

The processing unit 130 is an apparatus that executes an antenna design process according to the embodiment. The processing unit 130 is, for example, a Central Processing Unit (CPU).

The display unit 140 is an apparatus that executes display to prompt input to the input unit 110, and displays the processing result by the processing unit 130. The display unit 140 is, for example, a liquid crystal display apparatus.

The processing unit 130 includes an antenna characteristic simulation processing unit 131 and an antenna characteristic calculation processing unit 133. In an embodiment in which the antenna design apparatus 100 executes antenna design in view of the loss in the line as well, a line characteristic calculation processing unit 132 is further included in the processing unit 130.

The antenna characteristic simulation processing unit 131 includes a no-matching-circuit antenna-model creation unit 131a, a simulation execution unit 131b, and a simulation result judgment unit 131c.

The no-matching-circuit antenna-model creation unit 131a creates an antenna model that does not include the matching circuit, according to input data input via the input unit 110.

That is, in an embodiment in which the antenna design apparatus 100 executes antenna design in view of the interaction between the antenna elements and the loss in the matching element, the no-matching-circuit antenna-model creation unit 131a creates the antenna-alone model including a plurality of antenna elements. In addition, in an embodiment in which the antenna design apparatus 100 executes antenna design in view of the loss in the line between the antenna element and the wave source as well, the no-matching-circuit antenna-model creation unit 131a creates the antenna-alone model including a plurality of antenna elements, and an antenna model in which the line is connected to the antenna.

The simulation execution unit 131b executes a simulation for the antenna model created by the no-matching-circuit antenna-model creation unit 131a.

The simulation executed by the simulation execution unit 131b is an electromagnetic field simulation using, for example, the moment method, the finite element method, and the finite-difference time-domain method and the like.

By the simulation by the simulation execution unit 131b, the antenna characteristic for the antenna model that does not include the matching circuit is obtained. The antenna characteristic to be obtained includes the impedance, the S parameter, the radiation efficiency, and the total efficiency for each frequency set by the input via the input unit 110. These antenna characteristics are stored in the antenna characteristic file 121 of the storage unit 120.

When executing antenna design in view of the interaction between antenna elements and the loss in the matching element, the simulation result judgment unit 131c judges whether or not the antenna characteristic of the antenna-alone model satisfies the desired standard or not. In an embodiment to execute antenna design in view of the loss in the line as well, the simulation result judgment unit 131c judges whether or not the antenna characteristic of the antenna model including the antenna and the line satisfies the desired standard.

The judgment result by the simulation result judgment unit 131c is stored in the antenna characteristic file 121.

The line characteristic calculation processing unit 132 may be provided in the antenna design device 100 to execute antenna design in view of the loss in the line between the antenna element and the wave source as well.

The line characteristic calculation processing unit 132 calculates the characteristic for the model of the line created according to the input via the input unit 110.

The line characteristic calculation processing unit 132 includes a line model creation unit 132a and a line characteristic calculation unit 132b.

The line model creation unit 132a obtains data of the line and the substrate set by the input via the input unit 110 and creates the line model. Data of the line include data about the length and width of the line. Data of the substrate include data about the relative permittivity, the dielectric loss tangent, the thickness, the height of the conductor, and the permittivity of the substrate and the like.

The line characteristic calculation unit 132b calculates, for the line model created by the line model creation unit 132a, the characteristic impedance, the transfer coefficients (the attenuation constant and the phase constant) for each frequency set by the input via the input unit.

Each of the data about the characteristic impedance, the transfer coefficients (the attenuation constant and the phase constant) of the line calculated by the line characteristic calculation unit 132b is stored in the line characteristic file 122.

The antenna characteristic calculation processing unit 133 calculates the antenna characteristic of the antenna model which is created according to input via the input unit 110 and which includes the matching circuit using the calculation method according to the embodiment, and judges whether or not the calculated antenna characteristic satisfies the desired standard.

In the explanation below, the "antenna model including a matching circuit" (the "matching-circuit including antenna-model") or the "antenna model with a matching circuit" refers to a model including the antenna and the matching circuit, in an embodiment in which the antenna design apparatus 100 executes the design of the antenna in view of the interaction between the antenna elements and the loss in the matching element. In addition, the "antenna model including a matching circuit" (the "matching-circuit including antenna-model") or the "antenna model with a matching circuit" refers to a model including the antenna, the line, and the matching circuit, in an embodiment in which the antenna design apparatus 100 executes the design of the antenna in view of the loss in the line between the antenna element and the wave source as well.

The process by the antenna characteristic calculation processing unit 133 is executed when the antenna characteristic of the antenna model that does not include the matching circuit does not satisfy the desired standard values.

That is, in an embodiment in which the antenna design device apparatus 100 executes antenna design in view of the interaction between the antenna elements and the loss in the matching element, the process by the antenna characteristic calculation processing unit 133 is executed when the antenna characteristic of the antenna-alone model does not satisfy desired standard values. In addition, in an embodiment in which the antenna design apparatus 100 executes antenna design in view of the loss in the line between the antenna element and the wave source as well, the process by the antenna characteristic calculation processing unit 133 is executed when the antenna characteristic of the antenna model including the antenna and the line does not satisfy the desired standard value.

In some embodiments, when the total efficiency of the target frequency of the antenna model that does not include the matching circuit is below the desired standard value as a result of the judgment by the simulation result judgment unit 131c, the process by the antenna characteristic calculation processing unit 133 is performed.

In some embodiments, regardless of the judgment result by the simulation result judgment unit 131c, the process by the antenna characteristic calculation processing unit 133 is executed. For example, when the characteristic of the antenna alone, the characteristic of each element that constitute the matching circuit, and the characteristic of the line have been obtained by a certain means, the antenna characteristic calculation processing unit 133 executes the process using these obtained characteristics.

The antenna characteristic calculation processing unit 133 includes a matching-circuit including antenna-model creation unit 133a, an antenna characteristic calculation unit 133b, and a calculation result judgment unit 133c.

The matching-circuit including antenna-model creation unit 133a creates an antenna model including a matching circuit.

That is, in an embodiment in which the antenna design device apparatus 100 executes antenna design in view of the interaction between the antenna elements and the loss in the matching element, the matching-circuit including antenna-model creation unit 133a creates an antenna model including an antenna and a matching circuit. In addition, in an embodiment in which the antenna design apparatus 100 executes antenna design in view of the loss in the line between the antenna element and the wave source as well, the matching-circuit including antenna-model creation unit 133a creates an antenna model including the antenna, the matching circuit, and the line.

The matching-circuit including antenna-model creation unit 133a imports the antenna-alone antenna characteristic stored in the antenna characteristic file 121. That is, the matching-circuit including antenna-model creation unit 133a imports each data about the antenna impedance, the S parameter, and the radiation efficiency for each frequency to be the target.

In some embodiments, the matching-circuit including antenna-model creation unit 133a imports each data about the antenna impedance, the S parameter, and the radiation efficiency for each target frequency which are input via the input unit 110.

The matching-circuit including antenna-model creation unit 133a calculates the circuit configuration of the matching circuit based on the imported antenna impedance. In some embodiments, the matching-circuit including antenna-model creation unit 133a obtains data of the circuit configuration of the matching circuit input via the input unit 110.

The matching-circuit including antenna-model creation unit 133a decides the matching element which constitutes the matching circuit and which matches the usage conditions such as the size and withstanding pressure and the like according to the calculated or obtained data of the circuit configuration. Data of usage conditions such as the size and the withstanding pressure and the like are given in advance by the input via the input unit 110 and the like.

In some embodiments, the matching-circuit including antenna-model creation unit 133a decides the matching element to constitute the matching circuit, by referring to data of matching elements stored in the matching element data file 124. In some embodiments, the matching-circuit including antenna-model creation unit 133a decides the matching element that matches the usage conditions, based on data of matching elements input via the input unit 110.

the matching-circuit including antenna-model creation unit 133a obtains the parasitic inductance or the parasitic capacitance and the loss resistance, in addition to the capacitance or the inductance of the decided matching element.

In some embodiments, the parasitic inductance or the parasitic capacitance and the loss resistance are obtained by referring to the data of the corresponding matching element stored in the matching element data file 124. In addition, in some embodiments, the parasitic inductance or the parasitic capacitance and the loss resistance of the matching element are obtained by the input via the input 110.

Thus, in the embodiment, the antenna model with a matching circuit including the parasitic reactance and the loss resistance of the matching element is created by the matching-circuit including antenna-model creation unit 133a. In addition, each value including the parasitic reactance and the loss resistance of the matching element constituting the created matching circuit is obtained from the matching element data file 124, or specified by the input via the input unit 110.

Therefore, according to the embodiment, there is no need to create each model of the parasitic reactance and the loss resistance separately, or to set those values separately, in addition to the capacitance or the inductance of each matching element that constitute the matching circuit. Therefore, an antenna model with a matching circuit in view of the parasitic reactance and the loss resistance of the matching element may be created in a speedy and efficient manner.

In an embodiment in which the antenna design apparatus 100 executes antenna design in view of the loss in the line between the antenna element and the wave source as well, the matching-circuit including antenna-model creation unit 133a imports the characteristic of the line stored in the line characteristic file 122. That is, the matching-circuit including antenna-model creation unit 133a imports each data about the characteristic impedance of the line and the transfer coefficient (the attenuation constant and the phase constant) for each frequency to be the target. In addition, in some embodiments, the matching-circuit including antenna-model creation unit 133a imports each data about the characteristic impedance of the line and the transfer coefficient (the attenuation constant and the phase constant) for each frequency to be the target input via the input unit 110. The matching-circuit including antenna-model creation unit 133a creates an antenna model with a matching circuit that includes the line having the imported characteristic.

The antenna characteristic calculation unit 133b calculates the antenna characteristic of the antenna model with a matching circuit created by the matching-circuit including antenna-model creation unit 133a according to the calculation method of the embodiment.

That is, in some embodiments, the antenna characteristic calculation unit 133b calculates the antenna characteristic of the antenna model with a matching circuit in view of the loss of the matching element and the interaction between antenna elements by an analytical method that does not involve a simulation. In addition, in some embodiments, the antenna characteristic calculation unit 133b calculates the antenna characteristic of the antenna model with a matching circuit in view of the loss in the line in addition to the loss of the matching element and the interaction between antenna elements by an analytical method that does not involve a simulation.

The antenna characteristic calculated by the antenna characteristics calculation unit 133b includes the S parameter, the radiation efficiency, and the total efficiency.

In addition, the antenna characteristic calculation unit 133b may calculate the power consumption of the matching element and the line included in the antenna model with a matching circuit.

As an example of the calculation method of the antenna characteristic according to the embodiment, a method by which the antenna characteristic calculation unit 133b calculates the antenna characteristic of the antenna model with a matching circuit in view of the loss in the matching element, the loss in the line, and the interaction between the antenna elements is explained below.

Figure 2:
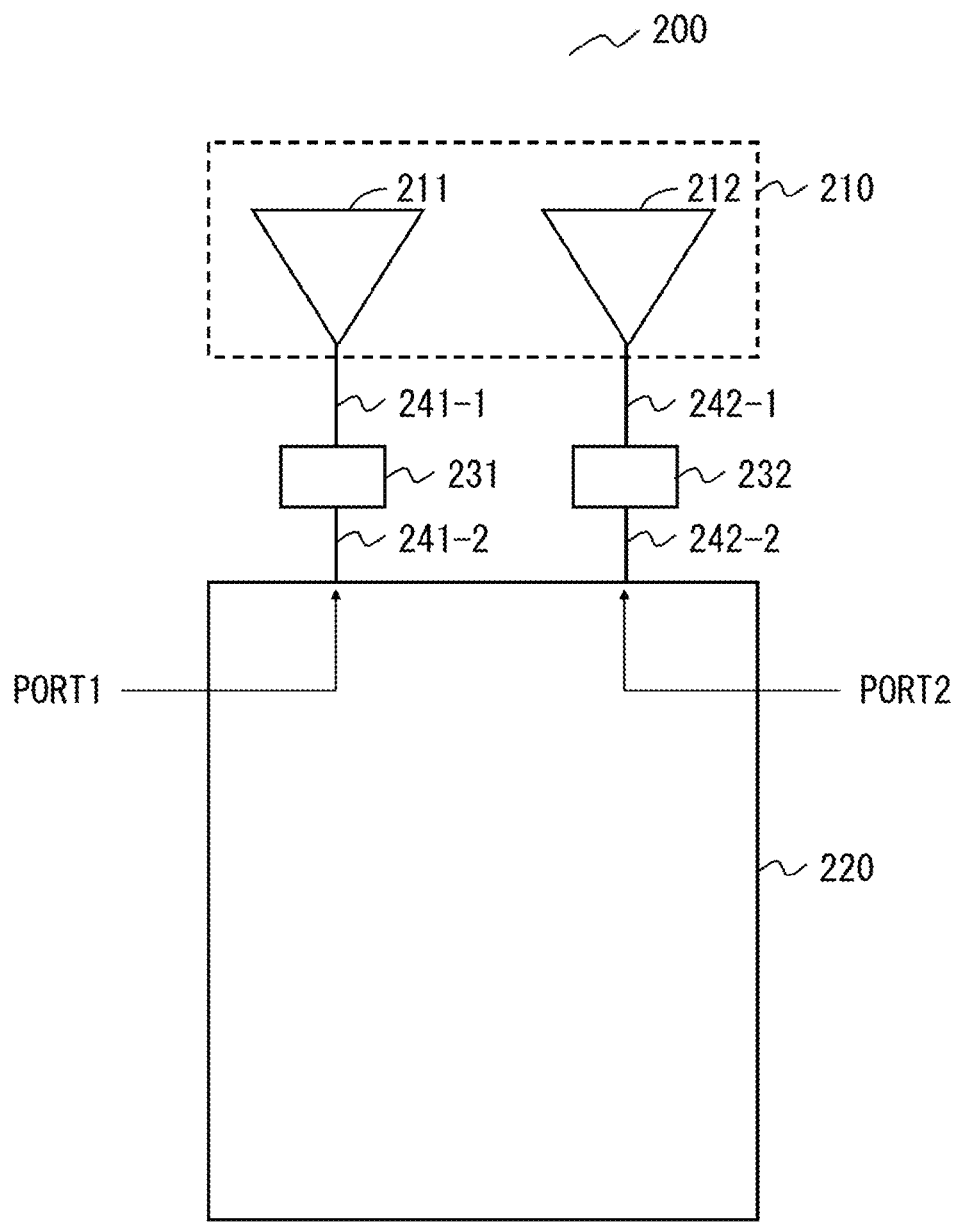
FIG. 2 illustrates a conceptual configuration diagram of an exemplary antenna model with a matching circuit.

FIG. 2 illustrates a conceptual configuration diagram of an exemplary antenna model with a matching circuit.

As illustrated in FIG. 2, the antenna model 200 with a matching circuit includes an antenna 210. The antenna 210 includes a first antenna element 211 and a second antenna element 212.

The first antenna element 211 is connected to a first line on the antenna element side 241-1, and is connected to a first matching circuit 231 via the first line on the antenna element side 241-1. In addition, the first antenna element 211 is connected to a first line on the wave source side 241-2 via the first line on the antenna element side 241-1 and a first matching circuit 231. Then, the first antenna element 211 may be connected to a ground conductor 220 via the first line on the antenna element side 241-1, the first matching circuit 231, and the first line on the wave source side 241-2. Between the first line on the wave source side 241-2 and the ground conductor 220, a wave source (not illustrated in the drawing) such as a transmitting/receiving module may be connected.

The second antenna element 212 is connected to a second line on the antenna element side 242-1, and is connected to a second matching circuit 232 via the second line on the antenna element side 242-1. In addition, the second antenna element 212 is connected to a line on the second wave source side 242-2 via the second line on the antenna element side 242-1 and the second matching circuit 232. Then, the second antenna element 212 may be connected to the ground conductor 220 via the second line on the antenna element side 242-1, the second matching circuit 232, and the second line on the wave source side 242-2. Between the second line on the wave source side 242-2 and the ground conductor 220, a wave source may be connected.

As illustrated in FIG. 2, the input/output port of the signal on the first antenna element 211 is defined as a first port (port 1), and the input/output port of the signal on the second antenna element 212 is defined as the second port (port 2).

Figure 3:
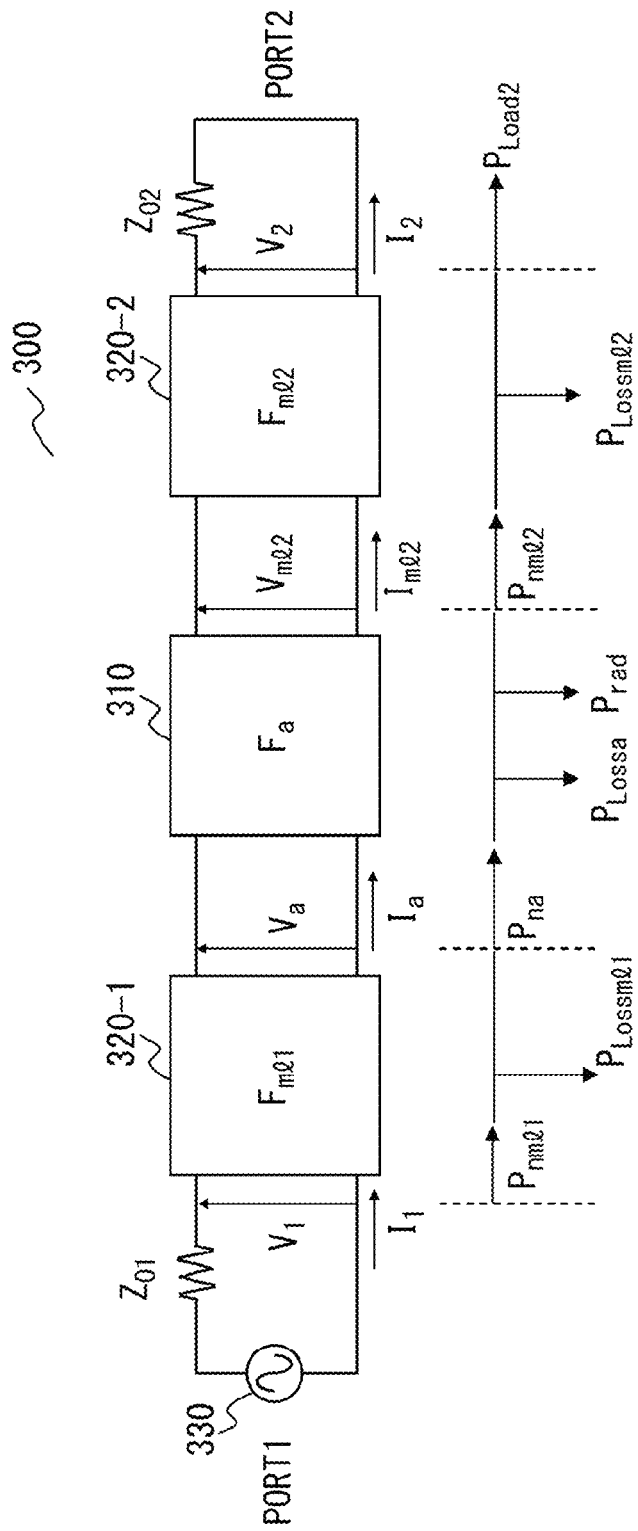
FIG. 3 illustrates an equivalent circuit diagram of the antenna model with a matching circuit illustrated in FIG. 2.

FIG. 3 is an equivalent circuit diagram of the antenna model with a matching circuit illustrated in FIG. 2. FIG. 2 illustrates an equivalent circuit in a case in which the first antenna element 211 is fed from the first port and the feeding voltage of the second antenna element 212 is 0V, as an example.

As illustrated in FIG. 3, an equivalent circuit 300 of the antenna model with a matching circuit includes an antenna 310, a first circuit 320-1, a second circuit 320-2, and a wave source 330.

The antenna 310 is an equivalent circuit of the antenna 210 including the first antenna element 211 and the second antenna element 212.

The first circuit 320-1 is an equivalent circuit of the first line on the antenna element side 241-1, the first matching circuit 231, and the first line on the wave source side 241-2. The second circuit 320-2 is an equivalent circuit of the second line on the antenna element side 242-1, the second matching circuit 232, and the second line on the wave source side 242-2.

Figure 4:
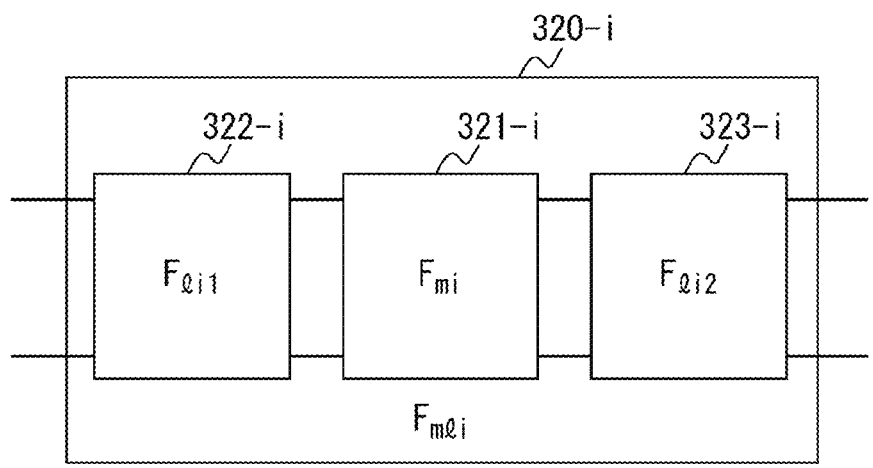
FIG. 4 illustrates an equivalent circuit diagram of the first and second circuits illustrated in FIG. 3.

FIG. 4 is an equivalent circuit diagram of the first and second circuits illustrated in FIG. 3. First or second circuit 320-$i$ (i is 1 or 2) illustrated in FIG. 4 includes a matching circuit 321-$i$, a first line 322-$i$, and a second line 323-$i$. The matching circuit 321-$i$ corresponds to the first matching circuit 231 and the second matching circuit 232, respectively. The first line 322-$i$ corresponds to the first line on the antenna element side 241-1 and the second line on the antenna element side 242-1, respectively. The second line 323-$i$ corresponds to the first line on the wave source side 241-2 and the second line on the wave source side 242-2, respectively.

$Z_{O1}$ in FIG. 3 is the reference impedance of the first port, and $Z_{O2}$ is the reference impedance of the second port. the reference impedance $Z_{O1}$ of the first port and $Z_{O2}$ of the second port may be for example equal to the reference impedance $Z_0$, at 50 ohm ($\Omega$) ($Z_{O1}=Z_{O2}=Z_0=50\Omega$). In the example illustrated in FIG. 3, the internal impedance of the wave source 240 corresponds with the reference impedance $Z_{O1}$.

First, the calculation method of the S parameter of the antenna model with a matching circuit according to the embodiment is explained.

In FIG. 3, $F_a$ represents the F parameter (Fundamental parameter) of the antenna 310 alone. $F_{ml1}$ represents the F parameter of the first circuit 320-1, and $F_{ml2}$ represents the F parameter of the second circuit 320-2.

The F parameter $F_a$ of the antenna 310 alone may be calculated from the S parameter $S_a$ of the antenna 310 alone. The S parameter $S_a$ of the antenna 310 alone is defined as follows.

$$S_a = \begin{pmatrix} S_{a11} & SA_{a12} \\ S_{a21} & S_{a22} \end{pmatrix} \quad (2)$$

In the elements of the S parameter $S_a$ of the antenna 310 alone, $S_{a21}$ is the transfer coefficient from the first port to the second port. The transfer coefficient $S_{a21}$ from the first port to the second port is included in the isolation characteristic between the first antenna element 211 and the second antenna element 212.

The F parameter of the antenna 310 alone may be calculated from the following expression (3) using the expression (2).

$$F_a = \begin{pmatrix} A_a & B_a \\ C_a & D_a \end{pmatrix} \\ = \begin{pmatrix} \frac{(1+S_{a11})(1-S_{a22})+S_{a12}S_{a21}}{2S_{a21}} & Z_0\frac{(1+S_{a11})(1+S_{a22})-S_{a12}S_{a21}}{2S_{21}} \\ \frac{1}{Z_0}\frac{(1-S_{a11})(1-S_{a22})-S_{a12}S_{a21}}{2S_{a21}} & \frac{(1-S_{a11})(1+S_{a22})+S_{a12}S_{a21}}{2S_{a21}} \end{pmatrix} \quad (3)$$

As described above, in the embodiment, the S parameter $S_a$ of the antenna 310 alone is a known value. That is, in some embodiments, the S parameter $S_a$ of the antenna 310 alone is obtained by the simulation by the simulation execution unit 131$b$ and stored in the antenna characteristic file 121. In some embodiments, the S parameter $S_a$ of the antenna 310 alone is obtained by inputting via the input unit 110. In addition, the value of $Z_0$(values of $Z_{O1}$ and $Z_{O2}$) is set by inputting via the input unit 110. Therefore, the F parameter $F_a$ of the antenna 310 alone may be calculated by substituting the S parameter $S_a$ of the antenna 310 alone into the expression (3).

In FIG. 4, $F_{mli}$ corresponds to the F parameter $F_{ml1}$ of the first circuit 320-1 illustrated in FIG. 3, the F parameter $F_{ml2}$ of the second circuit 320-2, respectively. $F_{mi}$ represents the F parameter of the first and second matching circuits 321-$i$. $F_{li1}$ represents the F parameter of the first line 322-$i$, and $F_{li2}$ represents the F parameter of the second line 323-$i$.

FIG. 5 is an exemplary equivalent circuit diagram of the first line and the second line. Assuming the first line 322-$i$ and the second line 323-$i$ as a distributed constant line and assuming the length of the line of the first line 322-$i$ and the second line 323-$i$ as x, it can be expressed by an equivalent circuit 400 of the transmission line illustrated in FIG. 5. As illustrated in FIG. 5, the equivalent circuit 400 of the transmission line includes an inductor $L_{dx}$ connected in series, a capacitor $C_{dx}$ connected in parallel, a resistance $R_{dx}$ being a loss in series, and a conductance $G_{dx}$ being a loss in parallel.

The characteristic of the equivalent circuit 400 of the transmission line illustrated in FIG. 5 is given by solving a telegraphic equation. In order to make the explanation clear, an example of the transmission line in a case of no loss and in the stationary condition is explained. As illustrated in FIG. 5, assuming the current and the voltage of the start point as $I_{x1}$ and $V_{x1}$ respectively and the current and the voltage of the endpoint as $I_{x2}$ and $V_{x2}$ respectively, the following expression (4) is established.

$$\begin{bmatrix} V_{x1} \\ I_{x1} \end{bmatrix} = F_x \begin{bmatrix} V_{x2} \\ I_{x2} \end{bmatrix} = \begin{bmatrix} \cosh\gamma x & Z_0\sinh\gamma x \\ Y_0\sinh\gamma x & \cosh\gamma x \end{bmatrix} \begin{bmatrix} V_{x2} \\ I_{x2} \end{bmatrix} \quad (4)$$

In the expression (4), $F_x$ is the F parameter of the transmission line of the length x. In addition, $Z_0$ is the characteristic impedance, $Y_0$ is the admittance and is $1/Z_0$. $\gamma$ is the transfer coefficient, and is expressed by the following expression (5) assuming the phase constant of the transmission line as $\beta$.

$$\gamma = \alpha + j\beta \quad (5)$$

As described above, in the embodiment, the line length $l_{i1}$, the characteristic impedance $Z_{il1}$, the attenuation constant $\alpha_{i1}$ and the phase constant $\beta_{i1}$ of the first line 322-$i$ are known values. In addition, the line length $l_{i2}$, the characteristic impedance $Z_{il2}$, the attenuation constant $\alpha_{i2}$ and the phase constant $\beta_{i2}$ of the second line 323-$i$ are known values. That is, the line lengths $l_{i1}$ and $l_{i2}$ are obtained respectively by input by the input unit 110. The characteristic impedance $Z_{il1}$ and $Z_{il2}$, the attenuation constants $\alpha_{i1}$ and $\alpha_{i2}$, and the phase constants $\beta_{i1}$ and $\beta_{i2}$ are calculated by the line characteristic calculation unit 132b and stored in the line characteristic file 122, and in some embodiments, these are obtained by input via the input unit 110.

Therefore, the F parameter $F_{li1}$ of the first line 322-$i$ and the F parameter $F_{li2}$ of the second line 323-$i$ may be calculated respectively, for example, using the expression (5).

FIG. 6 illustrates an example diagram of the first and second matching circuits.

For example, it is assumed that the first and second matching circuits 321-$i$ have three matching elements 321a, 321b, and 321c illustrated in FIG. 6 and those matching elements are connected in the pi($\pi$) figure. Defining the admittance of the three matching elements 321a, 321b, and 321c as $Y_{mi1}$, $Y_{mi2}$, and $Y_{mi3}$ respectively, the F parameter $F_{mi}$ of the first and second matching circuits 321-$i$ may be calculated respectively by the following expression (6).

$$F_{mi} = \begin{pmatrix} A_{mi} & B_{mi} \\ C_{mi} & D_{mi} \end{pmatrix} \quad (6)$$

$$= \begin{pmatrix} \dfrac{1+Y_{mi2}}{Y_{i3}} & \dfrac{1}{Y_{mi3}} \\ Y_{mi1}+Y_{mi2}+\dfrac{Y_{mi1}Y_{mi2}}{Y_{mi3}} & 1+\dfrac{Y_{mi1}}{Y_{mi3}} \end{pmatrix}$$

As described above, in the embodiment, the loss resistance $R_{mij}$ and the reactance $X_{mij}$ that constitute the impedance $Z_{mij}$ of each of the three matching elements 321a, 321b, and 321c are known values (in the example illustrated in FIG. 6, j is an integer 1-3). That is, these values are obtained by referring to data of the matching elements stored in the matching element data file 124 in some embodiments. In addition, in some embodiments, these values are obtained by inputting via the input unit 110. Then, the impedance $Z_{mij}$ of each of the three matching elements 321a, 321b, and 321c may be calculated by the following expression (7) using the loss resistance $R_{mij}$ and the reactance $X_{mij}$ that are known values.

$$Z_{mij} = R_{mij} + jX_{mij} \quad (7)$$

In addition, the admittance $Y_{mij}$ of each matching element included in the first and second matching circuits 321-$i$ may be obtained by calculating the reciprocal of the value of the impedance $Z_{mij}$ calculated by the expression (7).

Therefore, the F parameter $F_{mi}$ of the first and second matching circuits 321-$i$ may be respectively calculated by the expression (6).

Meanwhile, the first and second matching circuits 321-$i$ illustrated in FIG. 6 are an example, and it does not mean that the number of matching elements included in the first and second matching circuits 321-$i$ is limited to 3. The circuit configuration of the first matching circuit 321-1 and the circuit configuration of the second matching circuit 321-2 may be different.

In addition, in some embodiments, the antenna characteristic calculation unit 133b is also able to execute the following calculation process, in addition to the calculation process of the F parameter $F_{mi}$ of the first and second matching circuits 321-$i$ described above. That is, the antenna characteristic calculation unit 133b calculates the F parameter $F_{mi}$ in view of the impedance of the via along with impedance of the matching element.

For example, matching elements mounted in parallel to the antenna 310 like the matching element 321a and the matching element 321b illustrated in FIG. 6 are connected to the ground conductor via a ground via. When the impedance of the respective ground vias connected to these matching elements is not negligible, the antenna characteristic calculation unit 133 calculates the antenna characteristic of the antenna model 200 with a matching circuit in view of the impedance of these vias. That is, the antenna characteristic calculation unit 133b calculates the antenna characteristic of the antenna model 200 with a matching circuit in view of the impedance and/or resistance of the via.

For example, when the ground via has a cylindrical shape, the antenna characteristic calculation unit 133b calculates the inductance $L_v$ of the ground via by the following expression (8).

$$L_v = \dfrac{\mu_0}{2\pi}\left(h \cdot \ln\left(\dfrac{h+\sqrt{r^2+h^2}}{r}\right) + \dfrac{3}{2}\cdot\left(r - \sqrt{r^2+h^2}\right)\right) \quad (8)$$

In the expression (8), $\mu_0$ is the space permeability, h is the via length. In addition, r is the radius of the via, and assuming the via diameter as D, r=D/2.

For example, when the matching-circuit including antenna-model creation unit 133a calculates or obtains a circuit configuration in which the matching element is mounted in parallel to the antenna 310, the display unit 140 performs display to prompt input of each value of the via length h and the via diameter D. Then, each value of the via length h and the via diameter D is input via the input unit 110. The antenna characteristic calculation unit 133b calculates the inductance $L_v$ of the via using each value of the via length h and the via diameter D.

In addition, for example, when the ground via has a cylindrical shape, the antenna characteristic calculation unit 133b calculates the resistance $R_v$ of the via by the following expression (9).

$$R_v = R_{v0}\sqrt{1+\dfrac{f}{f_\delta}} \quad (9)$$

In the expression (9), f is the signal frequency, and $R_{v0}$ is the direct current resistance of the via. In addition, $f_\delta$ in the expression (9) is expressed by the following expression (10).

$$f_\delta = \dfrac{\rho}{\pi \cdot \mu_0 \cdot t^2} \quad (10)$$

In the expression (10), ρ is the resistivity of the conductor, t is the thickness of the metallization in the via, and assuming the via diameter D as the outer diameter of the via and assuming the inner diameter of the via as D', t=D−D'.

For example, when the matching-circuit including antenna-model creation unit 133a calculates or obtains a circuit configuration in which the matching element is mounted in parallel to the antenna 210, the display unit 140 performs display to prompt input each value of the via outer diameter D, via inner diameter D', the resistivity ρ, and the direct current resistance $R_{v0}$. Then, each value of the via outer diameter D, via inner diameter D', the resistivity ρ, and the direct current resistance $R_{v0}$ are input via the input unit 110. The antenna characteristic calculation unit 133b calculates the via resistance $R_v$ using the input each value of the via outer diameter D, via inner diameter D', the resistivity ρ, and the direct current resistance $R_{v0}$.

The antenna characteristic calculation unit 133b adds the calculated inductance $L_v$ of the via to the reactance $X_{mij}$ of the matching element to be connected to the via. In addition, the antenna characteristic calculation unit 133b adds the calculated resistance $R_v$ of the via to the loss resistance $R_{mij}$ of the matching element to be connected to the via. The calculation method of the F parameter $F_{mi}$ of the first and second matching circuits 321-i executed after the addition of the via inductance $L_v$ and/or the resistance $R_v$ is the same as described above.

The F parameter $F_{mli}$ of the first and second circuits 320-i illustrated in FIG. 3 may be calculated respectively by the following expression (11) using the calculated F parameter $F_{mi}$ of the first and second matching circuits 321-i, the F parameter $F_{li1}$ of the first line 322-i, and the F parameter $F_{li2}$ of the second line 323-i.

$$F_{mli} = F_{li1} \times F_{mi} \times F_{li2} \quad (11)$$

$$= \begin{pmatrix} A_{mli} & B_{mli} \\ C_{mli} & D_{mli} \end{pmatrix}$$

In addition, the compound F parameter $F_{mla}$ of the equivalent circuit 300 of the antenna model with a matching circuit may be calculated by the following expression (12) using the calculated F parameter $F_a$ of the antenna alone, the F parameter $F_{ml1}$ of the first circuit 320-1, and the F parameter $F_{ml2}$ of the second circuit 320-2.

$$F_{mla} = F_{ml1} \times F_a \times F_{ml2} \quad (12)$$

$$= \begin{pmatrix} A_{mla} & B_{mla} \\ C_{mla} & D_{mla} \end{pmatrix}$$

The S parameter $S_{mla}$ of the equivalent circuit 300 of the antenna model with a matching circuit may be calculated by the following expression (13) using the calculated compound F parameter $F_{mla}$.

$$S_{mla} = \begin{pmatrix} S_{11} & S_{12} \\ S_{21} & S_{22} \end{pmatrix}$$

$$= \begin{pmatrix} \dfrac{A_{mla} + B_{mla}/Z_0 - C_{mla}Z_0 - D_{mla}}{A_{mla} + B_{mla}/Z_0 + C_{mla}Z_0 + D_{mla}} & \dfrac{2(A_{mla}D_{mla} - B_{mla}C_{mla})}{A_{mla} + B_{mla}/Z_0 + C_{mla}Z_0 + D_{mla}} \\ \dfrac{2}{A_{mla} + B_{mla}/Z_0 + C_{mla}Z_0 + D_{mla}} & \dfrac{-A_{mla} + B_{mla}/Z_0 - C_{mla}Z_0 + D_{mla}}{A_{mla} + B_{mla}/Z_0 + C_{mla}Z_0 + D_{mla}} \end{pmatrix} \quad (13)$$

In the expression (13), $S_{21}$ is the transfer coefficient from the first port to the second port in the antenna model 200 with a matching circuit. The transfer coefficient $S_{21}$ from the first port to the second port is included in the isolation characteristic between the first antenna element 211 and the second antenna element 212.

The S parameter $S_{mla}$ calculated by the expression (13) is the S parameter in a case in which the first antenna element 211 is fed from the first port and the feeding voltage of the second antenna element 212 is 0V as illustrated in FIG. 3.

On the other hand, the S parameter in a case in which the second antenna element 212 is fed from the second port and the feeding voltage of the first antenna element 211 is 0V may be obtained by calculating the inverse matrix $F_{mla}^{-1}$ of the F parameter $F_{mla}$ and by calculating by the expression (13) using the calculated $F_{mla}^{-1}$.

In addition, as described above, $Z_0$ in the expression (13) is reference impedance, which is, for example, 50Ω. That is, the value of the S parameter $S_{mla}$ calculated by the expression (13) is the S parameter in a ($Z_{01}=Z_{02}=Z_0$) case where the values of and $Z_{02}$ are both $Z_0$.

On the other hand, the S parameter $S_{mla}'$ in a case in which the value of the reference impedance of a port that is not fed to the antenna element such as the second port in FIG. 3 is set to a value $Z_0'$ which is different from the $Z_{01}$ may be calculated by a conversion equation of the S parameter illustrated in the following expression (14). That is, the S parameter $S_{mla}'$ in a case in which the value of $Z_{01}$ or $Z_{02}$ is $Z_0'$ may be calculated using the S parameter $S_{mla}$ in a case in which the values of $Z_{01}$ and $Z_{02}$ are both set to $Z_0$.

$$S'_{mla} = W^{-1}(S_{mla}-\Gamma)(I-\Gamma S_{mla})W \quad (14)$$

In the expression (14), I represents a unit matrix and $W^{-1}$ represents the inverse matrix of W. In addition, W and Γ are a diagonal matrix respectively represented by the following expression (15) and (16).

$$W = \frac{2(Z_0' \cdot Z_0)^{1/2}}{Z_0' + Z_0} = \begin{pmatrix} \dfrac{2(Z_{01}' \cdot Z_0)^{1/2}}{Z_{01}' + Z_0} & 0 \\ 0 & \dfrac{2(Z_{02}' \cdot Z_0)^{1/2}}{Z_{02}' + Z_0} \end{pmatrix} \quad (15)$$

$$\Gamma = \frac{Z_0' - Z_0}{Z_0' + Z_0} = \begin{pmatrix} \dfrac{Z_{01}' - Z_0}{Z_{01}' + Z_0} & 0 \\ 0 & \dfrac{Z_{02}' - Z_0}{Z_{02}' + Z_0} \end{pmatrix} \quad (16)$$

In the expressions (15) and (16), $Z_0'$ is the reference impedance of the first port after change, that is, the reference impedance of the first port that may be changed to a value that is different from reference impedance $Z_0$. $Z_{02}'$ is the reference impedance of the second port after change. For example, in the equivalent circuit 300 of the antenna model with a matching circuit illustrated in FIG. 3, the reference impedance $Z_{02}$ of the second port may be set to $Z_{01}'$. Then, in the equivalent circuit 300 of the antenna model with a matching circuit illustrated in FIG. 3, the reference impedance $Z_{01}'$ of the first port after change is $Z_0$, and the reference impedance $Z_{02}'$ of the second port after change is $Z_0'$.

However, when a port that is not fed to the antenna element is shorted, that is, when the value of $Z_{01}'$ or $Z_{02}'$ is 0, $W^{-1}$ being the inverse matrix of W does not exist. In addition, when a port that is not fed to the antenna element is opened, that is, when the value of $Z_{01}'$ or $Z_{02}'$ is infinite ($\infty$), $W^{-1}$ does not exist. Therefore, when the value of $Z_{01}$ or $Z_{02}$ is 0 or infinity, the calculation is made as follows instead of the expression (14).

First, in a case in which the first antenna element 211 is fed from the first port and the feeding voltage of the second antenna element 212 is 0V as in FIG. 3, the input impedance $Z'_{in\_mla}$ when the value of $Z_{02}$ is 0 is calculated from the following expression (17). In addition, the input impedance $Z'_{in\_mla}$ when the value of $Z_{02}$ is infinite is calculated from the following expression (18).

$$Z'_{in\_mla} = \frac{B_{mla}}{D_{mla}} \quad (17)$$

$$Z'_{in\_mla} = \frac{A_{mla}}{C_{mla}} \quad (18)$$

In the expression (17) and the expression (18), $A_{mla}$, $C_{mla}$ and $D_{mla}$, are elements of the F parameter $F_{mla}$ as expressed in the expression (12), and these are calculable values.

Then, the S parameter $S'_{in\_mla}$ in a case in which the first antenna element 211 is fed from the first port and the feeding voltage of the second antenna element 212 is 0V may be calculated by the following expression (19) using the input impedance $Z'_{in\_mla}$ calculated by the expression (17) or the expression (18).

$$S'_{11\_ma} = \frac{Z'_{in\_mla} - Z_0}{Z'_{in\_mla} + Z_0} \quad (19)$$

In addition, in a case in which the second antenna element 212 is fed from the second port and the feeding voltage of the first antenna element 211 is 0V, the input impedance $Z'_{in\_ma}$ when $Z_{01}$ is 0 is calculated by the following expression (20). The input impedance $Z'_{in\_ma}$ when $Z_{01}$ is infinite is calculated by the following expression (21).

$$Z'_{in\_mla} = \frac{B'_{mla}}{D'_{mla}} \quad (20)$$

$$Z'_{in\_mla} = \frac{A'_{mla}}{C'_{mla}} \quad (21)$$

In the expression (20) and the expression (21), $A'_{mla}$, $B'_{mla}$, $C'_{mla}$, and $D'_{mla}$ are elements of the inverse matrix $F_{mla}'$ of the F parameter $F_{mla}$ as expressed in the expression (22), and these are calculatable values.

$$F_{mla}^{-1} = \begin{pmatrix} A'_{mla} & B'_{mla} \\ C'_{mla} & D'_{mla} \end{pmatrix} \quad (22)$$

Then, the S parameter $S'_{in\_mla}$ in a case in which the second antenna element 212 is fed from the second port and the feeding voltage of the first antenna element 211 is 0V may be calculated from the above expression (19) using the input impedance $Z'_{in\_ma}$ calculated by the expression (20) or the expression (21).

As described above, the antenna characteristic calculation unit 133b obtains the S parameter of the antenna model with a matching circuit that takes into consideration of the loss in the matching element including the parasitic reactance and the loss resistance, and the loss in the line, and the interaction between antenna elements, without simulation. That is, in the embodiment, the antenna characteristic calculation unit 133b calculates the S parameter of the antenna model with a matching circuit using the characteristic of the antenna alone including a plurality of antenna elements, the characteristic of each matching element constituting the matching circuit, and the characteristic of the line, by an analytical method.

Therefore, according to the embodiment, the antenna characteristic of the antenna model with a matching circuit in view of the loss in the matching element, the loss in the line, and the interaction between antenna elements may be obtained in a short time, and the desired antenna may be designed efficiently.

Next, the calculation method of the radiation efficiency of the antenna model with a matching circuit according to the embodiment is explained.

In FIG. 3, $P_{nml1}$ is the net electric power sent out from the wave source 330 and input to the first circuit 320-1.

$P_{na}$ is the net electric power input to the antenna 310, and is expressed by relational expression $P_{na} = P_{nml1} - P_{Lossml1}$ assuming the loss due to mismatching in the first circuit as $P_{Lossml1}$.

$P_{rad}$ is the radiation power, and is expression by relational expression $P_{rad} = P_{na} - P_{Lossa}$ assuming the power lost by the loss included in the antenna 210 such as dialectic loss and conductor loss and the like.

$P_{nml2}$ is the net electric power input to the second circuit 320-1, and is expressed by relational expression $P_{nml2} = P_{na} - (P_{Lossmla} + P_{rad})$.

$P_{Load2}$ is the electric power output to the second port, which is expressed by $P_{Load2} = P_{nml2} - P_{Lossml2}$ assuming the loss due to mismatching in the second circuit as $P_{Lossml2}$.

In FIG. 3, $I_1$ is the electric current flowing in the circuits subsequent to the wave source 330, and is the current flowing in the first circuit 320-1, the antenna 310, the second circuit 320-2, and the load on the second port side. $V_1$ is the voltage applied to the circuits subsequent to the wave source 330, and is the voltage applied to the first circuit 320-1, the antenna 310, the second circuit 320-2, and the load on the second port side.

$I_a$ is the electric current flowing in the circuits subsequent to the first circuit 320-1, and is the current flowing in the antenna 310, the second circuit 320-2, and the load on the second port side. $V_a$ is the voltage applied to the circuits subsequent to the first circuit 320-1, and is the voltage applied to the antenna 310, the second circuit 320-2, and the load on the second port side.

$I_{ml2}$ is the electric current flowing in the circuits subsequent to the antenna 310, and is the current flowing in the second circuit 320-2 and the load on the second port side. $V_{ml2}$ is the voltage applied to the circuits subsequent to the antenna 310, and is the voltage applied to the second circuit 320-2 and the load on the second port side.

$I_2$ is the electric current flowing in the circuit subsequent to the second circuit 320-2, and is the currents flowing the load on the second port side. $V_2$ is the voltage applied to the circuits subsequent to the second circuit 320-2, and is the voltage applied to the load on the second port side.

In the equivalent circuit 300 of the antenna model with a matching circuit, the radiation efficiency η may be calculated by the following expression (23).

$$\eta = \frac{P_{rad}}{P_{nml1}} \qquad (23)$$

$$= \frac{P_{rad} + P_{Lossa}}{P_{nml1}} \frac{P_{rad}}{P_{rad} + P_{Lossa}}$$

$$= \frac{P_{na} - P_{nml2}}{P_{nml1}} \frac{P_{rad}}{P_{rad} + P_{Lossa}}$$

$P_{na}$, $P_{nml2}$, $P_{nml1}$, and $P_{rad}/(P_{rad}++P_{Lossa})$ in the expression (23) may respectively be calculated as follows.

First, $P_{rad}/(P_{rad}+P_{Lossa})$ in the expression (23) may be derived as follows using an equivalent circuit of the antenna 210 alone.

FIG. 7 illustrates an equivalent circuit diagram of an exemplary antenna-alone model. In an equivalent circuit 500 of the antenna alone model illustrated in FIG. 7, the same reference numerals are assigned to the same elements as those in the equivalent circuit 300 of the antenna model with a matching circuit.

In FIG. 7, the radiation efficiency $\eta_a$ of the antenna 310 alone may be expressed as in the following expression (24).

$$\eta_a = \frac{P_{rad}}{P_{na}} = \frac{P_{rad}}{P_{Lossa} + P_{rad} + P_{Load2}} \qquad (24)$$

In addition, $P_{na}$ may be expressed as in the following expression (25) using the F parameter $F_a$ of the antenna 310 alone expressed in the expression (3).

$$P_{na} = \mathrm{Re}[V_1 I_1^*] \qquad (25)$$

$$= \mathrm{Re}[(A_a V_2 + B_a I_2)(C_a V_2 + D_a I_2)^*]$$

Here, in the analysis of the antenna characteristic for the antenna 210 alone model, $Z_{01}=Z_{02}=Z_0$ is set. In addition, from $V_2=Z_{02}I_2$, $P_{na}$ may further be expressed as in the following expression (26) below.

$$P_{na} = \mathrm{Re}[(Z_0 A_a + B_a)(Z_0 C_a + D_a)^*]|I_2|^2 \qquad (26)$$

Further, $P_{Load2}$ may be expressed as in the following expression (27).

$$P_{load2} = \mathrm{Re}[V_2 I_2^*] \qquad (27)$$

$$= Z_0 |I_2|^2$$

From the expression (26) and the expression (27), the relationship between $P_{na}$ and $P_{Load2}$ may be expressed as in the following expression (28).

$$\frac{P_{load2}}{P_{na}} = \frac{Z_0 |I_2|^2}{\mathrm{Re}[(Z_0 A_a + B_a)(Z_0 C_a + D_a)^*]|I_2|^2} \qquad (28)$$

$$= \frac{Z_0}{\mathrm{Re}[(Z_0 A_a + B_a)(Z_0 C_a + D_a)^*]}$$

$$\equiv \alpha$$

Then, $P_{rad}/(P_{rad}+P_{Lossa})$ in the expression (23) may be expressed as in the expression (29) using the expression (24) and the expression (28).

$$\frac{P_{rad}}{P_{rad} + P_{Lossa}} = \frac{P_{rad}}{P_{na}} \frac{P_{na}}{P_{rad} + P_{Lossa}} \qquad (29)$$

$$= \eta_a \frac{P_{na}}{P_{na} - P_{load2}}$$

$$= \frac{\eta_a}{1 - \alpha}$$

As described above, in the embodiment, $\eta_a$ in the expression (29) is a known value. That is, the radiation efficiency $\eta_a$ of the antenna 210 alone is obtained by the simulation by the simulation execution unit 131b and stored in the antenna characteristic file 121 in some embodiments. In addition, in some embodiments, the radiation efficiency $\eta_a$ of the antenna 310 alone is obtained by input via the input unit 110. In the embodiment, α in the expression (29) may be calculated by the expression (28).

Therefore, $P_{rad}/(P_{rad}+P_{Lossa})$ in the expression (23) may be calculated by the expression (29).

Next, $P_{nml2}$ in the expression (23) may be expressed as in the following expression (30).

$$P_{nml2} = \mathrm{Re}[V_{ml2} I_{ml2}^*] \qquad (30)$$

$$= \mathrm{Re}[(Z_{02} A_{ml2} + B_{ml2})(Z_{02} C_{ml2} + D_{ml2})^*]|I_2|^2$$

$A_{ml2}$, $B_{ml2}$, $C_{ml2}$, and $D_{ml2}$ in the expression (30) are elements of the F parameter $F_{ml2}$ of the second circuit 320-2, and are calculable as described above presenting the expression (11). In addition, in the antenna model 200 with a matching circuit, the reference impedance of the port that does not feed to the antenna element may be the reference impedance $Z_0$, and may also be an arbitrary value $Z_0'$. That is, in the example illustrated in FIG. 3, the reference impedance $Z_{02}$ of the second port in the expression (30) is a known value given by input via the input unit 110.

In addition, $P_{na}$ in the expression (23) may be expressed as in the expression (31).

$$P_{na} = \mathrm{Re}[V_a I_a^*] \qquad (31)$$

$$= \mathrm{Re}[(A_{aml2} V_2 + B_{aml2} I_2)(C_{aml2} V_2 + D_{aml2} I_2)^*]$$

$$= \mathrm{Re}[(Z_{02} A_{aml2} + B_{aml2})(Z_{02} C_{aml2} + D_{aml2})^*]|I_2|^2$$

$A_{aml2}$, $B_{aml2}$, $C_{aml2}$, and $D_{aml2}$ in the expression (31) are elements of the matrix expressed by the following expression (32).

$$F_{aml2} = \begin{pmatrix} A_{aml2} & B_{aml2} \\ C_{aml2} & D_{aml2} \end{pmatrix} \qquad (32)$$

-continued $$= F_a F_{ml2}$$

$$= \begin{pmatrix} A_a & B_a \\ C_a & D_a \end{pmatrix} \begin{pmatrix} A_{ml2} & B_{ml2} \\ C_{ml2} & D_{ml2} \end{pmatrix}$$

$$= \begin{pmatrix} A_a A_{ml2} + B_a C_{ml2} & A_a B_{ml2} + B_a D_{ml2} \\ C_a A_{ml2} + D_a C_{ml2} & C_a B_{ml2} + D_a D_{ml2} \end{pmatrix}$$

As described above presenting the expression (3) and the expression (11), in the embodiment, $F_a$ and $F_{ml2}$ are calculable. Therefore, in the embodiment, $A_{mla2}$, $B_{mla2}$, $C_{mla2}$, and $D_{mla2}$ in the expression (31) are calculable. In addition, as described above, $Z_{02}$ is a known value.

Then, $P_{nml1}$ in the expression (23) may be expressed as in the following the expression (33).

$$P_{nml1} = \text{Re}[V_1 I_1^*] \qquad (33)$$
$$= \text{Re}[(A_{mla}V_2 + B_{mla}I_2)(C_{mla}V_2 + D_{mla}I_2)^*]$$
$$= \text{Re}[(A_{mla}Z_{02} + B_{mla})(C_{mla}Z_{02} + D_{mla})^*]|I_2|^2$$

As described above presenting the expression (12), in the embodiment, $A_{mla}$, $B_{mla}$, $C_{mla}$, and $D_{mla}$ in the expression (31) are calculable. In addition, as mentioned above, $Z_{02}$ in the expression (31) is a known value.

As illustrated above, $P_{rad}/(P_{rad}+P_{Lossa})$, $P_{nml2}$, $P_{na}$, and $P_{nml1}$ in the expression (23) may be expressed using the expression (29), the expression (30), the expression (31), and the expression (33), respectively.

Here, the value of $P_{rad}/(P_{rad}+P_{Lossa})$ is assumed as invariable in the antenna 210 alone model and the antenna model 200 with a matching circuit. Substituting the expression (29), the expression (30), the expression (31), and the expression (33) into the expression (23), $|I_2|^2$ is cancelled out during the calculation.

Therefore, the radiation efficiency η of the antenna model 200 with a matching circuit may be calculated by the expression (23).

Meanwhile, as described above, in the antenna model 200 with a matching circuit, the reference impedance of the port that does not feed to the antenna element does not have to be the reference impedance $Z_0$, and an arbitrary value may be given. That is, in the example illustrated in FIG. 3, as the reference impedance $Z_{02}$ of the second port, an arbitrary value from 0 to infinity (∞) may be given.

However, when a case in which the second port is opened and $Z_{02}$ is set as infinite, it is impossible to calculate $P_{nml2}$, $P_{na}$, and $P_{nml1}$ in the expression (23) using the expression (30), the expression (31), and the expression (33).

Then, when $Z_{02}$ is set as infinite, the expression (30), the expression (31), and the expression (33) described above are transformed into the expression (34), the expression (35), and the expression (36), respectively.

$$P_{nml2} = |Z_{02}|^2 \text{Re}\left[\left(A_{ml2} + \frac{B_{ml2}}{Z_{02}}\right)\left(C_{ml2} + \frac{D_{ml2}}{Z_{02}}\right)^*\right]|I_2|^2 \qquad (34)$$

$$P_{na} = |Z_{02}|^2 \text{Re}\left[\left(A_{aml2} + \frac{B_{aml2}}{Z_{02}}\right)\left(C_{aml2} + \frac{D_{aml2}}{Z_{02}}\right)^*\right]|I_2|^2 \qquad (35)$$

$$P_{nml1} = |Z_{02}|^2 \text{Re}\left[\left(A_{mla} + \frac{B_{mla}}{Z_{02}}\right)\left(C_{mla} + \frac{D_{mla}}{Z_{02}}\right)^*\right]|I_2|^2 \qquad (36)$$

The radiation efficiency η of the antenna model 200 with a matching circuit in a case in which $Z_{02}$ is set as infinite may be calculated as in the following expression (37) using the expression (29), the expression (34), the expression (35), and the expression (36).

$$\eta = \frac{P_{na} - P_{nml2}}{P_{nml1}} \frac{P_{rad}}{P_{rad} + P_{Lossa}} \qquad (37)$$

$$= \frac{|Z_{02}|^2 \text{Re}\left[\begin{array}{c}\left(A_{aml2} + \frac{B_{aml2}}{Z_{02}}\right)\left(C_{aml2} + \frac{D_{aml2}}{Z_{02}}\right)^* - \\ \left(A_{ml2} + \frac{B_{ml2}}{Z_{02}}\right)\left(C_{ml2} + \frac{D_{ml2}}{Z_{02}}\right)^*\end{array}\right]|I_2|^2}{|Z_{02}|^2 \text{Re}\left[\left(A_{mla} + \frac{B_{mla}}{Z_{02}}\right)\left(C_{mla} + \frac{D_{mla}}{Z_{02}}\right)^*\right]|I_2|^2} \frac{P_{rad}}{P_{rad} + P_{Lossa}}$$

$$= \frac{\text{Re}\left[\begin{array}{c}\left(A_{aml2} + \frac{B_{aml2}}{Z_{02}}\right)\left(C_{aml2} + \frac{D_{aml2}}{Z_{02}}\right)^* - \\ \left(A_{ml2} + \frac{B_{ml2}}{Z_{02}}\right)\left(C_{ml2} + \frac{D_{ml2}}{Z_{02}}\right)^*\end{array}\right]}{\text{Re}\left[\left(A_{mla} + \frac{B_{mla}}{Z_{02}}\right)\left(C_{mla} + \frac{D_{mla}}{Z_{02}}\right)^*\right]} \frac{P_{rad}}{P_{rad} + P_{Lossa}}$$

$$== \frac{\text{Re}[A_{aml2}C_{aml2}^* - A_{ml2}C_{ml2}^*]}{\text{Re}[A_{mla}C_{mla}^*]} \frac{P_{rad}}{P_{rad} + P_{Lossa}}$$

Meanwhile, as illustrated in FIG. 3, the calculation method of the radiation efficiency η in a case in which the first antenna element 211 is fed from the first port and the feeding voltage of the second antenna element 212 is 0V is explained above. However, the radiation efficiency η in the case in which the second antenna element 212 is fed from the second port and the feeding voltage of the first element 211 is 0V may also be calculated in a similar method.

As described above, the antenna characteristic calculation unit 133b obtains the radiation efficiency η of the antenna model with a matching circuit that takes into consideration of the loss in the matching element including the parasitic reactance and the loss resistance, and the loss in the line, and the interaction between antenna elements, without simulation. That is, in the embodiment, the antenna characteristic calculation unit 133b calculates the radiation efficiency η of the antenna model with a matching circuit using the characteristic of the antenna alone including a plurality of antenna elements, the characteristic of each matching element constituting the matching circuit, and the characteristic of the line, by an analytical method.

Therefore, according to the embodiment, the antenna characteristic of the antenna model with a matching circuit in view of the loss in the matching element including the parasitic reactance and the loss resistance, the loss in the line, and the interaction between antenna elements may be obtained in a short time, and the desired antenna may be designed efficiently.

Lastly, the calculation method of the total efficiency of the antenna model with a matching circuit according to the embodiment is explained.

The total efficiency $η_t$ of the antenna model with a matching circuit may be calculated by the expression (38).

$$f_t = η(1 - |S_{11}|^2) \qquad (38)$$

As described above presenting the expression (13), in the embodiment, the reflection coefficient $S_{11}$ in the expression (38) is calculable. In addition, as described above presenting the expression (23) and the expression (37), in the embodiment, the radiation efficiency η in the expression (38) is calculable.

Therefore, the total efficiency $\eta_t$ of the antenna model with a matching circuit may be calculated by the expression (38).

As described above, the antenna characteristic calculation unit 133b obtains the total efficiency $\eta_t$ of the antenna model with a matching circuit that takes into consideration of the loss in the matching element including the parasitic reactance and the loss resistance, and the loss in the line, and the interaction between antenna elements, without simulation. That is, in the embodiment, the antenna characteristic calculation unit 133b calculates the total efficiency $\eta_t$ of the antenna model with a matching circuit using the characteristic of the antenna alone including a plurality of antenna elements, the characteristic of each matching element constituting the matching circuit, and the characteristic of the line, by an analytical method.

Therefore, according to the embodiment, the antenna characteristic of the antenna model with a matching circuit in view of the loss in the matching element, the loss in the line, and the interaction between antenna elements may be obtained in a short time, and the desired antenna may be designed efficiently.

Meanwhile, the calculation method of the antenna characteristic of the antenna model with a matching circuit in view of the loss in the matching element, the loss in the line, and the interaction between antenna elements is explained as an example of the calculation method of the antenna characteristic according to the embodiment. However, it is obvious that the antenna characteristic of the antenna model with a matching circuit in view of the loss in the matching element and the interaction between antenna elements may also be calculated by transforming the above calculation method by omitting the calculation about the line, and the like, and the similar effect to the effect described above can be obtained.

The calculation method of the antenna characteristic according to the embodiment has a sufficient calculation accuracy for practical use, and this is explained below using a specific example. In the explanation below, the antenna characteristic by the calculation method according to the embodiment and the antenna characteristic by the electromagnetic field simulation are compared. The antenna characteristic by the electromagnetic field simulation may also be obtained by a computer that follows any electromagnetic field simulation software such as Poynting (registered trademark) and the like.

Meanwhile, the specific example illustrated below is an example for explaining the calculation accuracy of the calculation method of the antenna characteristic according to the embodiment, and does not means that it is impossible for the calculation method according to the embodiment to have the sufficient accuracy for practical use without using the respective values of the parameters presented in the specific value.

FIG. 8 illustrates an explanatory diagram of an antenna model with a matching circuit used to test the calculation accuracy.

An antenna model 600 with a matching circuit illustrated in FIG. 8 includes an antenna 610, a ground conductor 620, and a substrate 630.

The antenna 610 is allocated on the top surface of the substrate 630, and the ground conductor 620 is allocated on the bottom surface of the substrate 630. The ground conductor 620 does not exist under the antenna 610 allocated on the top surface of the substrate 630.

The antenna 610 includes a first antenna element 611 and a second antenna element 612. The first antenna element 611 and the second antenna element 612 are linear antenna elements. The each width of the first antenna element 611 and the second antenna element 612 is 1 mm.

The linear first antenna element 611 is bent at a right angle and includes a first straight line part 611a on the port 1 side and a second straight line part 611b on the opposite side of the port 1 side, with the bending point being the boundary. The length of the first straight line part 611a is 10 mm, and the length of the second straight line part 611b is 24 mm.

In addition, the linear second antenna element 612 is bent a right angle and includes a third straight line part 612a on the port 2 side and a fourth straight line part 612b on the opposite side of the port 2 side, with the bending point being the boundary. The length of the third straight line part 612a is 10 mm, and the length of the fourth straight line part 612b is 11 mm.

Thus, the shape of the first antenna element 611 and the shape of the second antenna element 612 are different, and the shape of the antenna 610 is asymmetric.

The ground conductor 620 is a metal plate having a rectangular surface (the top surface and the bottom surface). The length of the side of the surface of the ground conductor 620 in the parallel direction to the first straight line part 611a and the third straight line part 612a is 100 mm. The length of the side in the parallel direction to the second straight line part 611b and the fourth straight line part 612b is 50 mm. The ground conductor 620 is assumed as a perfect conductor.

The substrate 630 is allocated between the antenna 610 and the ground conductor 620. The thickness of the substrate 630 is 1 mm. The relative permittivity of the substrate 630 is 4.0, and the dielectric loss is 0.02 at 2 GHz.

Matching circuit are respectively connected to the port 1 side of the first antenna element 611 and to the port 2 side of the second antenna element 612.

Figure 9:
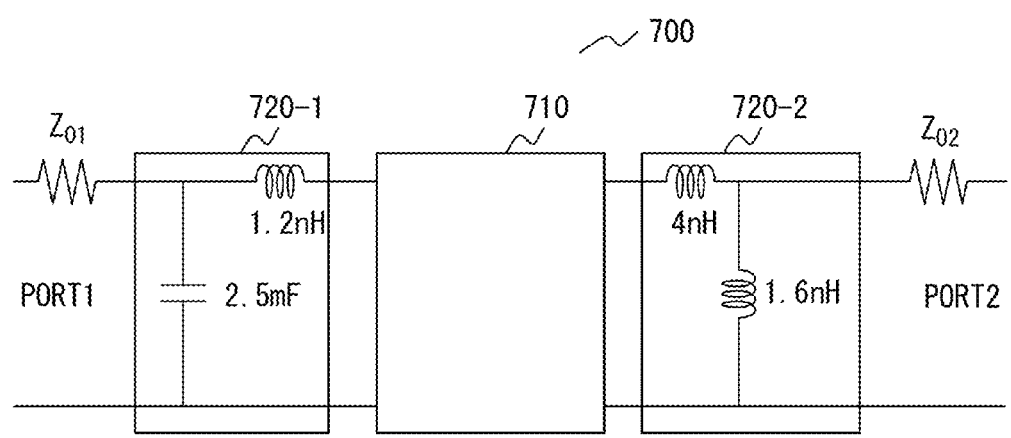
FIG. 9 illustrates an equivalent circuit diagram of the antenna model with a matching circuit illustrated FIG. 8.

FIG. 9 illustrates an equivalent circuit diagram of the antenna model with a matching circuit illustrated in FIG. 8. In an equivalent circuit 700 of an antenna model with a matching circuit illustrated in FIG. 9, the antenna 710 corresponds to the antenna 610. A first matching circuit 720-1 corresponds to the matching circuit connected to the port 1 side of the first antenna element 611, and a second matching circuit 720-2 corresponds to the second antenna element 612 connected to the port 2 side of the second antenna element 612.

As illustrated in FIG. 9, the first matching circuit 720-1 includes an inductor connected in series to the first antenna element 611, and its inductance is 1.2 nH. In addition, the first matching circuit 720-1 includes a capacitor connected in parallel to the first antenna element 611, and its capacitance is 2.5 nF. In addition, the second matching circuit 720-2 includes an inductor connected in series to the second antenna element 612, and its inductance is 4 nH. In addition, the second matching circuits 720-2 includes an inductor connected in parallel to the second antenna element 612, and its inductance is 1.6 nH.

First, as a first test example, the antenna characteristic of the antenna model 600 with a matching circuit is a case in which the reference impedance $Z_{01}$ of the first port and the reference impedance $Z_{02}$ of the second port are both 50Ω ($Z_{01}=Z_{02}=Z_0=50$Ω) is explained.

The test result of the S parameter in the first test example is explained with reference to FIG. 10-FIG. 14. The test result in FIG. 10-FIG. 14 is the test result when the first antenna element 611 is fed from the port 1 and the feeding voltage from the port 2 to the second antenna element 612 is 0V.

Figure 10:
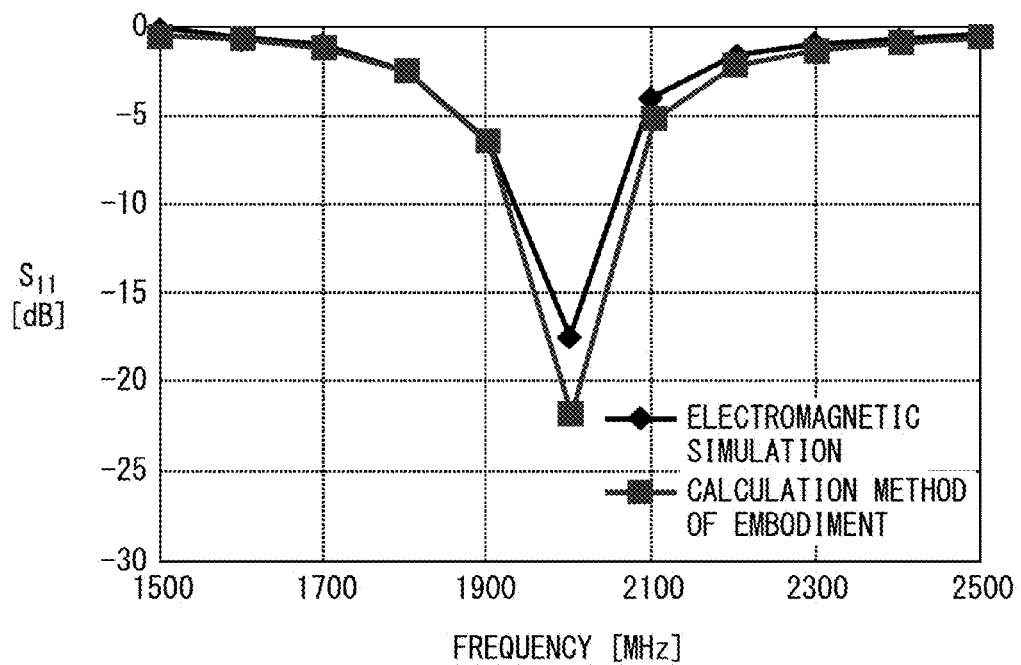
FIG. 10 illustrates an frequency characteristic diagram of $S_{11}$ in the first test example.

FIG. 10 illustrates a frequency characteristic diagram of $S_{11}$ in the first test example. FIG. 11 illustrates a Smith chart of $S_{11}$ in the first test example. As is understood from FIG. 10 and FIG. 11, the trend of the shift of the reflection coefficient $S_{11}$ of the port 1 at the measurement frequencies 1500-2500 MHz approximately corresponds between the simulation result by the electromagnetic field simulation and the calculation method according to the embodiment. For example, the frequency at which the value of the reflection coefficient $S_{11}$ of the port 1 is lowest corresponds between the simulation result by the electromagnetic field simulation and the calculation method according to the embodiment and is about 2000 MHz. In addition, the value of the reflection coefficient $S_{11}$ of the port 1 at the measurement frequencies 1500-2500 MHz approximately corresponds between the simulation result by the electromagnetic field simulation and the calculation method according to the embodiment.

Figure 13:
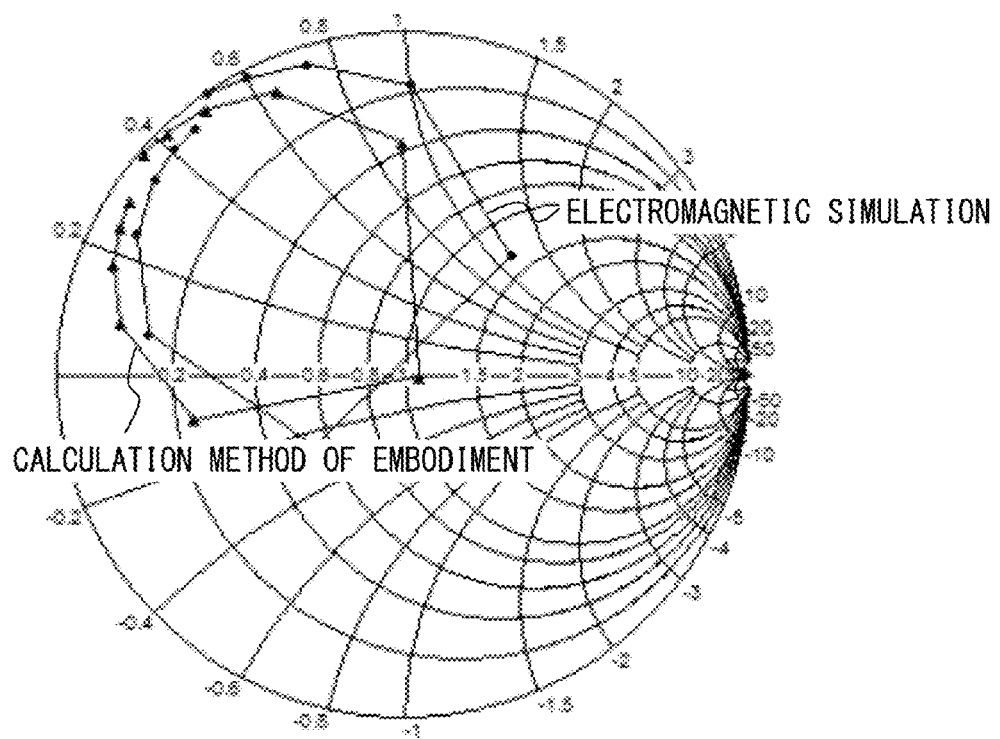
FIG. 13 illustrates a Smith chart of $S_{22}$ in the first test example.

FIG. 12 illustrates a frequency characteristic diagram of $S_{22}$ in the first test example. FIG. 13 illustrates a Smith chart of $S_{22}$ in the first test example. As is understood from FIG. 12 and FIG. 13, the trend of the shift of the reflection coefficient $S_{22}$ of the port 2 at the measurement frequencies 1500-2500 MHz approximately corresponds between the simulation result by the electromagnetic field simulation and the calculation method according to the embodiment. For example, the frequency at which the value of the reflection coefficient $S_{22}$ of the port 2 is lowest corresponds between the simulation result by the electromagnetic field simulation and the calculation method according to the embodiment and is about 2000 MHz. In addition, the value of the reflection coefficient $S_{22}$ of the port 2 at the measurement frequencies 1500-2500 MHz approximately corresponds between the simulation result by the electromagnetic field simulation and the calculation method according to the embodiment.

FIG. 14 illustrates a frequency characteristic diagram of $S_{21}$ and $S_{12}$ in the first test example. As is understood from FIG. 14, the trend of the shift of the transfer coefficient $S_{21}$ from the port 1 to the port 2 and the transfer coefficient $S_{12}$ from the port 2 to the port 1 at the measurement frequencies 1500-2500 MHz approximately corresponds between the simulation result by the electromagnetic field simulation and the calculation method according to the embodiment. For example, the frequency at which the value of the transfer coefficients $S_{21}$ and $S_{12}$ is highest corresponds between the simulation result by the electromagnetic field simulation and the calculation method according to the embodiment and is about 2000 MHz.

Thus, from the test result presented in FIG. 10-FIG. 14, it is understood that the calculation method of the embodiment is a calculation method that has a sufficient calculation accuracy for practical use.

The test result of the radiation efficiency and the total efficiency in the first test example is explained with reference to FIG. 15-FIG. 18.

Figure 15:
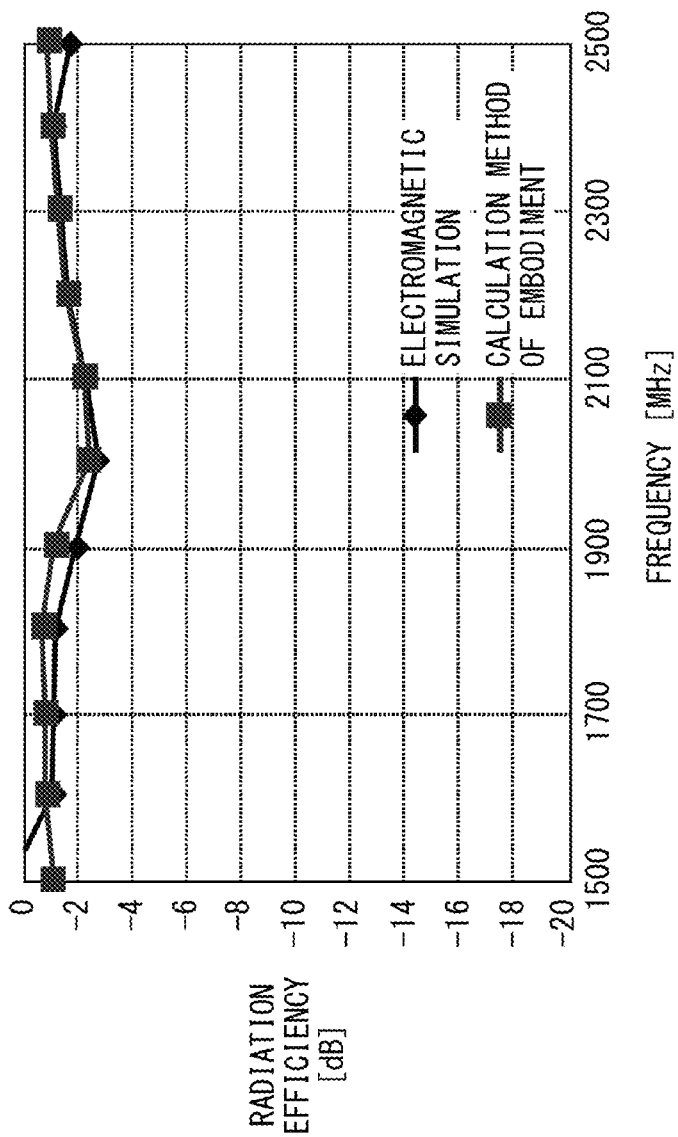
FIG. 15 illustrates a frequency characteristic diagram of the radiation efficiency of the first antenna element in the first test example.
Figure 16:
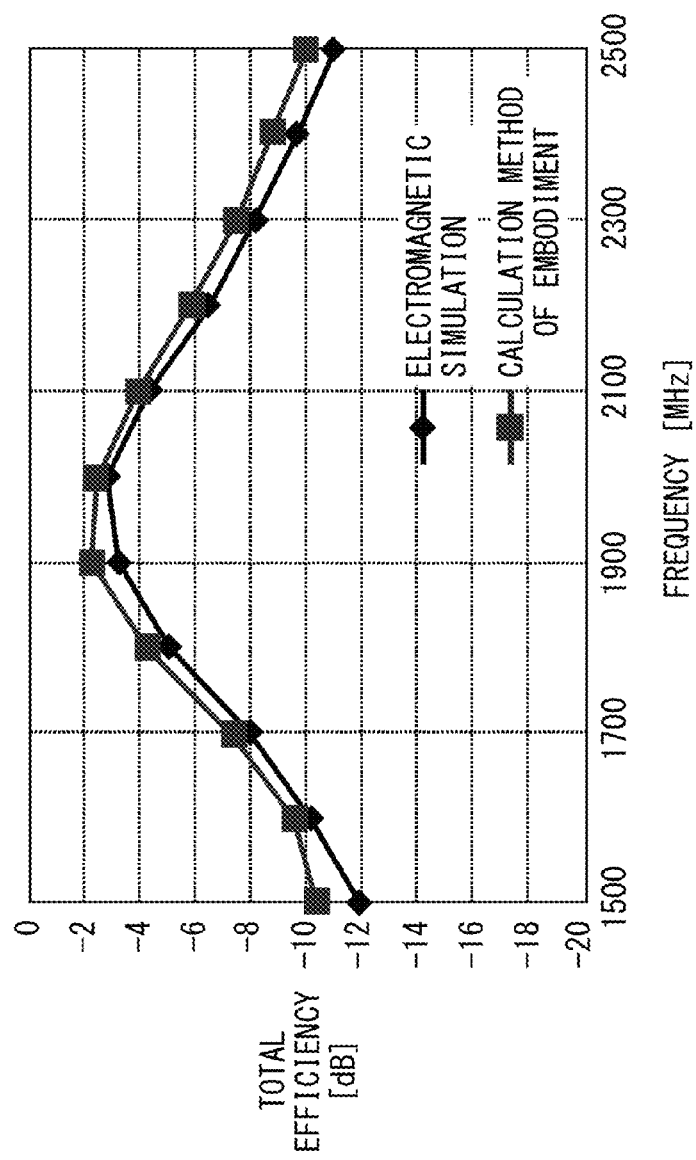
FIG. 16 illustrates a frequency characteristic diagram of a total efficiency of the first antenna element in the first test example.

FIG. 15 illustrates a frequency characteristic diagram of the radiation efficiency of the first antenna element in the first test example. FIG. 16 illustrates a frequency characteristic diagram of the total efficiency of the first antenna element in the first test example. The test result illustrated in FIG. 15 and FIG. 16 is the test result when the first antenna element 611 is fed from the port 1 and the feeding voltage from the port 2 to the second antenna element 612 is 0V.

As is understood from FIG. 15 and FIG. 16, the trend of the shift of the radiation efficiency and the total efficiency of the first antenna element 611 at the measurement frequencies 1500-2500 MHz approximately corresponds between the simulation result by the electromagnetic field simulation and the calculation method according to the embodiment. In addition, the value of the radiation efficiency and the total efficiency of the first antenna element 611 at the measurement frequencies 1500-2500 MHz approximately corresponds between the simulation result by the electromagnetic field simulation and the calculation method according to the embodiment. For example, as described above in the explanation about the expression (23), in the calculation of the reflection efficiency according to the embodiment, it is assumed that the value of $P_{rad}/(P_{rad}+P_{Lossa})$ is invariable in the antenna alone model and the antenna model with a matching circuit. From the test example in FIG. 15 and FIG. 16, it is understood that the calculation method of the embodiment using such assumption is a calculation method that has a sufficient calculation accuracy for practical use.

Figure 17:
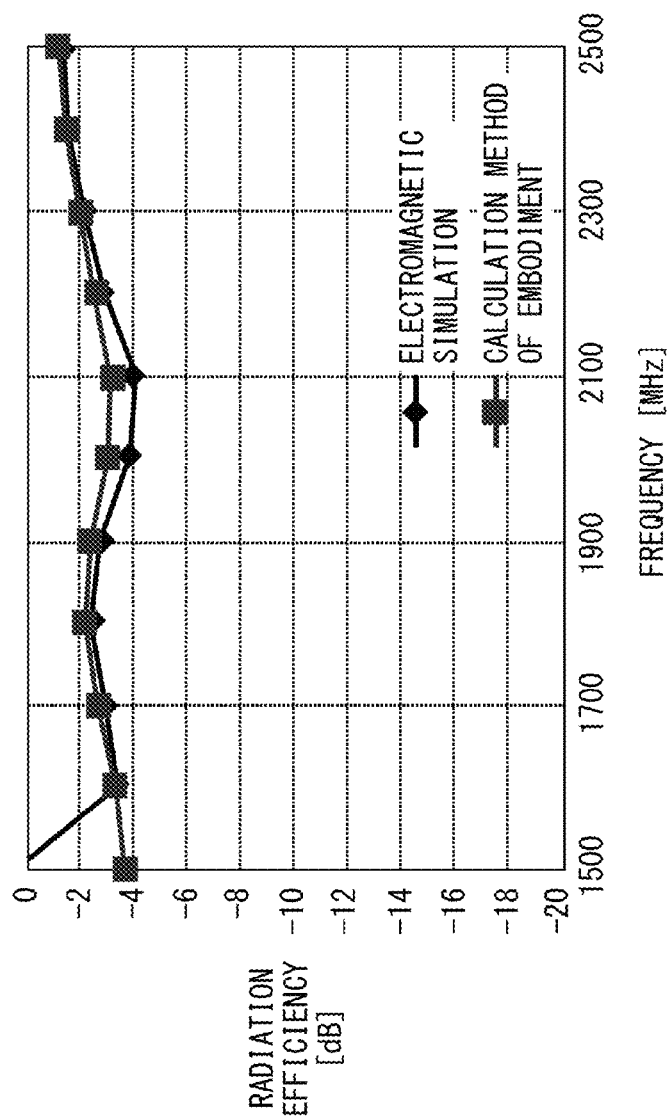
FIG. 17 illustrates a frequency characteristic diagram of the radiation efficiency of the second antenna element in the first test example.
Figure 18:
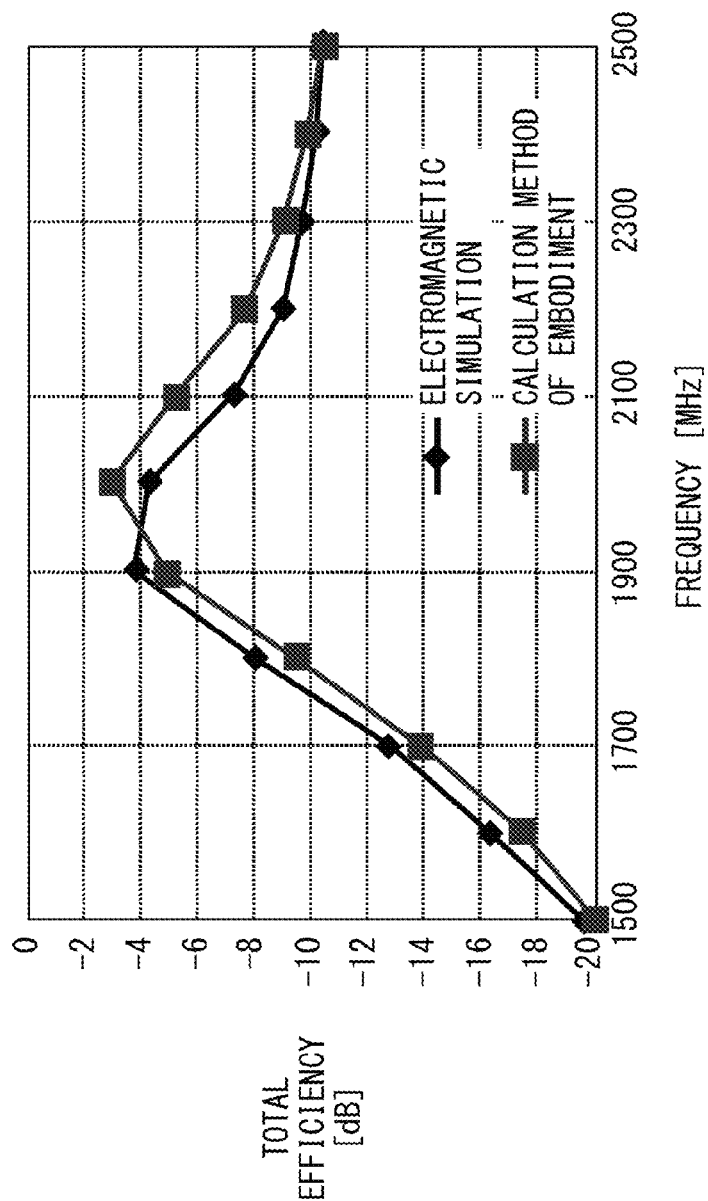
FIG. 18 illustrates a frequency characteristic diagram of a total efficiency of the second antenna element in the first test example.

FIG. 17 illustrates a frequency characteristic diagram of the radiation efficiency of the second antenna element in the first test example. FIG. 18 illustrates a frequency characteristic diagram of the total efficiency of the second antenna element in the first test example. The test result illustrated in FIG. 17 and FIG. 18 is the test result when the second antenna element 612 is fed from the port 2 and the feeding voltage from the port 1 to the first antenna element 611 is 0V.

As is understood from FIG. 17 and FIG. 18, the trend of the shift of the radiation efficiency and the total efficiency of the second antenna element 612 at the measurement frequencies 1500-2500 MHz approximately corresponds between the simulation result by the electromagnetic field simulation and the calculation method according to the embodiment. In addition, the value of the radiation efficiency and the total efficiency of the second antenna element 612 at the measurement frequencies 1500-2500 MHz approximately corresponds between the simulation result by the electromagnetic field simulation and the calculation method according to the embodiment. From the test example in FIG. 17 and FIG. 18, it is understood that the calculation method of the embodiment using assumption described above is a calculation method that has a sufficient calculation accuracy for practical use.

Next, as a second test example, the antenna characteristic of the antenna model 600 with a matching circuit is a case in which the reference impedance $Z_{01}$ of the first port is 50Ω ($Z_{01}=Z_0=50Ω$), and the reference impedance $Z_{02}$ of the second port is a value other than 50Ω ($Z_{02} \neq Z_0$).

Figure 20:
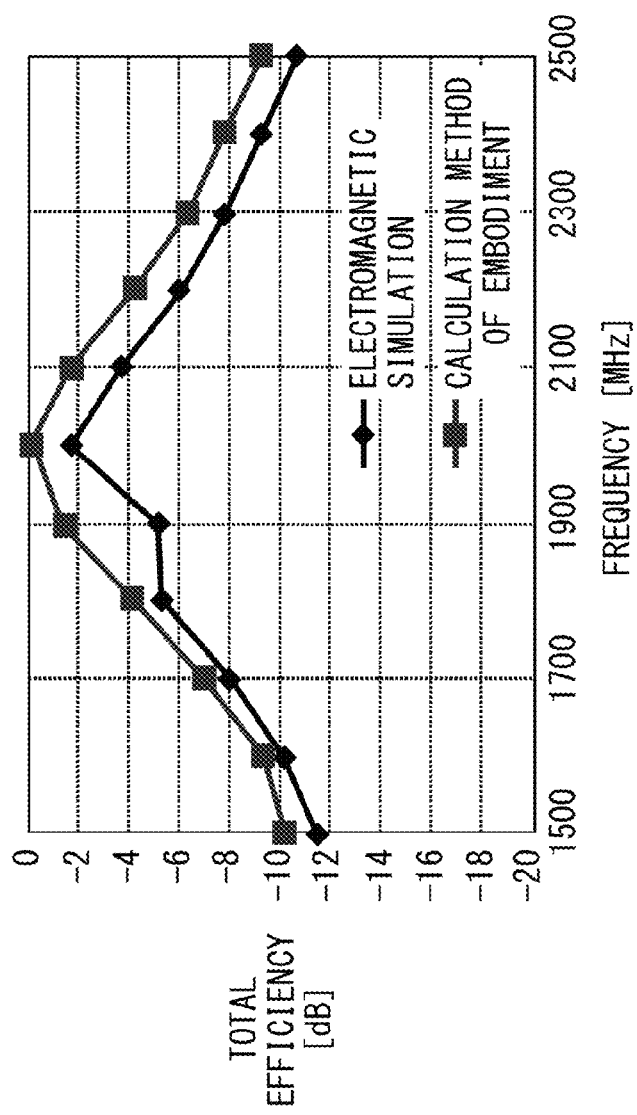
FIG. 20 illustrates a frequency characteristic diagram of the total efficiency of the first antenna element in a case in which reference impedance $Z_{02}$ of the second port is 0.
Figure 22:
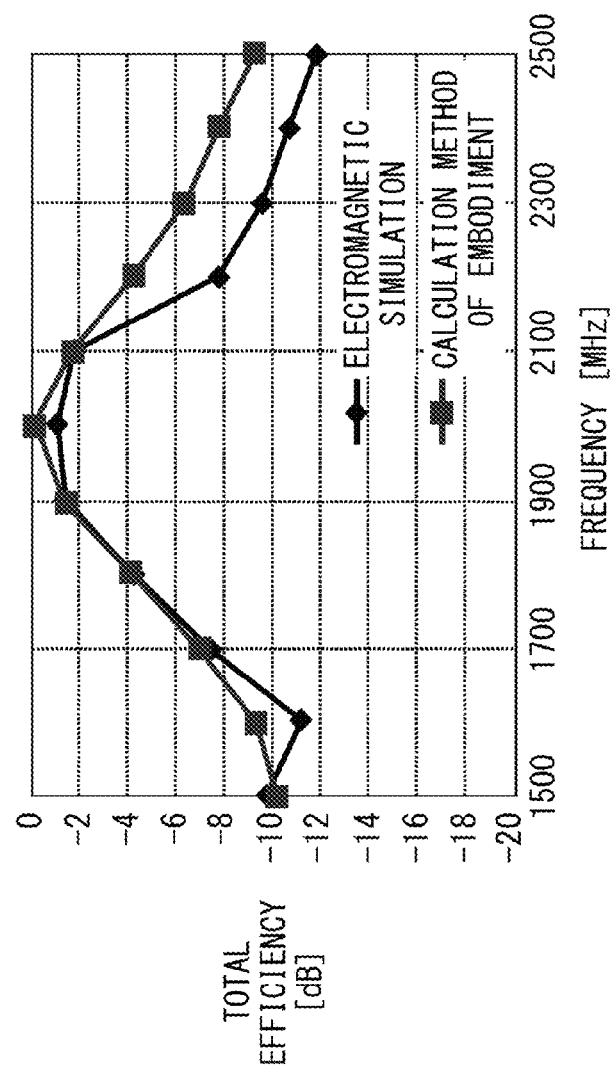
FIG. 22 illustrates a frequency characteristic diagram of the total efficiency of the first antenna element in a case in which reference impedance $Z_{02}$ of the second port is infinite.

The test result of the S parameter in the second test example is explained with reference to FIG. 19-FIG. 22. The test result in FIG. 19-FIG. 22 is the test result when the first antenna element 611 is fed from the port 1 and the feeding voltage from the port 2 to the second antenna element 612 is 0V. In addition, the test result in FIG. 19 and FIG. 20 is the test result when the reference impedance $Z_{02}$ of the second port is 0. The test result in FIG. 21 and FIG. 22 is the test result when the reference impedance $Z_{02}$ of the second port is infinite.

FIG. 19 illustrates a frequency characteristic diagram of $S_{11}$ in a case in which the reference impedance $Z_{02}$ of the second port is 0. As is understood from FIG. 19, the trend of the shift of the reflection coefficient $S_{11}$ of the port 1 at the measurement frequencies 1500-2500 MHz approximately corresponds between the simulation result by the electromagnetic field simulation and the calculation method according to the embodiment. For example, the frequency at which the value of the reflection coefficient $S_{11}$ of the port 1 is lowest corresponds between the simulation result by the electromagnetic field simulation and the calculation method according to the embodiment and is about 2100 MHz. In addition, the value of the reflection coefficient $S_{11}$ of the port 1 at the measurement frequencies 1500-2500 MHz approximately corresponds between the simulation result by the electromagnetic field simulation and the calculation method according to the embodiment.

FIG. 20 illustrates a frequency characteristic diagram of the total efficiency of the first antenna element in a case in which the reference impedance $Z_{02}$ of the second port is 0.

As is understood from FIG. 20, the trend of the shift of the total efficiency of the first antenna element 611 at the measurement frequencies 1500-2500 MHz approximately corresponds between the simulation result by the electromagnetic field simulation and the calculation method according to the embodiment. In addition, the value of total efficiency of the first antenna element 611 at the measurement frequencies 1500-2500 MHz approximately corresponds between the simulation result by the electromagnetic field simulation and the calculation method according to the embodiment.

FIG. 21 illustrates a frequency characteristic diagram of $S_{11}$ in a case in which the reference impedance $Z_{02}$ of the second port is infinite. As is understood from FIG. 21, the trend of the shift of the reflection coefficient $S_{11}$ of the port 1 at the measurement frequencies 1500-2500 MHz approximately corresponds between the simulation result by the electromagnetic field simulation and the calculation method according to the embodiment. For example, the frequency at which the value of the reflection coefficient $S_{11}$ of the port 1 is lowest corresponds between the simulation result by the electromagnetic field simulation and the calculation method according to the embodiment and is about 2000 MHz. In addition, the value of the reflection coefficient $S_{11}$ of the port 1 at the measurement frequencies 1500-2500 MHz approximately corresponds between the simulation result by the electromagnetic field simulation and the calculation method according to the embodiment.

FIG. 22 illustrates a frequency characteristic diagram of the total efficiency of the first antenna element in a case in which the reference impedance $Z_{02}$ of the second port is infinite.

As is understood from FIG. 22, the trend of the shift of the total efficiency of the first antenna element 611 at the measurement frequencies 1500-2500 MHz approximately corresponds between the simulation result by the electromagnetic field simulation and the calculation method according to the embodiment. In addition, the value of total efficiency of the first antenna element 611 at the measurement frequencies 1500-2500 MHz approximately corresponds between the simulation result by the electromagnetic field simulation and the calculation method according to the embodiment.

From the above test result presented in FIG. 19 and FIG. 21, it is understood that the calculation method of the embodiment is a calculation method that has a sufficient calculation accuracy for practical use even when the reference impedance of the port of the antenna element to which is not fed is set to an arbitrary value. In addition, from the test result in FIG. 20 and FIG. 22, it is understood that the calculation method of the embodiment using assumption as described above is a calculation method that has a sufficient calculation accuracy for practical use even when the reference impedance of the port of the antenna element to which is not fed is set to an arbitrary value.

From the test results of the first and second test examples described above, it is understood that the calculation method of the embodiment is a calculation method that has a sufficient calculation accuracy for practical use.

An example of the antenna design process flow according to the embodiment is explained below.

FIG. 23 illustrates an example diagram of an antenna design process flow according to an embodiment.

The antenna design process flow illustrated in FIG. 23 is an example of a process flow in a case in which the antenna design apparatus 100 executes antenna design in view of the interaction between antenna elements and the loss in the matching element, as well as the loss in the line between the antenna and the wave source. The antenna design process flow illustrated in FIG. 23, except the process regarding the design of the line, is an example of a process flow in a case in which the antenna design apparatus 100 executes antenna design in view of the interaction between antenna elements and the loss in the matching element only.

In step 101, the no-matching-circuit antenna-model creation unit 131a creates a model of the antenna alone, according to condition data of the model input via the input unit 110. In addition, the no-matching-circuit antenna-model creation unit 131a creates a model including the antenna and the line, according to condition data of the model input via the input unit 110. The antenna created by the no-matching-circuit antenna-model creation unit 131a includes a plurality of antenna elements. As described above, in the condition data of the model input via the input unit 110 includes data related to the shape of the model, the material of the model, the wave source, the circuit part, the analysis conditions, and analysis output items.

The line model creation unit 132a creates the model of the line according to condition data of the model input via the input unit 110.

In step 102, the simulation execution unit 131b executes a simulation for the antenna alone mode created by the no-matching-circuit antenna-model creation unit 131a, and obtains the antenna characteristic. In addition, the simulation execution unit 131b executes a simulation for the model including the antenna and the line which is created by the no-matching-circuit antenna-model creation unit 131a, and obtain the antenna characteristic.

Specifically, the simulation execution unit 131b obtains the antenna characteristic in a case 1 in which the first antenna element included in the antenna is fed and the feeding voltage of the second antenna element is 0V. In addition, the simulation execution unit 131b obtains the antenna characteristic in a case 2 in which the second antenna element included in the antenna is fed and the feeding voltage of the first antenna element is 0V.

In the simulation by the simulation execution unit 131b, the reference impedance of the port that does not feed to the antenna element may be an arbitrary setting value input via the input unit 110.

In addition, as described above presenting the expression (14) and the expression (29) and the like, for the calculation process of the antenna characteristic of the antenna with a matching circuit according to the embodiment, the antenna characteristic in a case in which the reference impedance of the port of the antenna element to which is not fed and the reference impedance of the port of the antenna element to which is fed are the same value used. Therefore, to use for such calculation process, a simulation is also performed for a case in which the reference impedance of the port of the antenna element to which is not fed and the reference impedance of the port of the antenna element to which is fed are the same value.

The antenna characteristic obtained by the simulation execution unit 131b includes the impedance, the S parameter, the radiation efficiency, and the total efficiency for each frequency set by inputting by the input unit 110. The antenna characteristics in the case 1 and case 2 for the antenna alone model obtained by the simulation execution unit 131b are respectively stored in the antenna characteristic file 121.

The line characteristic calculation unit 132b calculates the characteristic of the line using the line model created by the line model creation unit 132a. The characteristic of the line to be calculated includes the impedance of the line, the transfer coefficient (the attenuation constant and the phase constant) for each frequency set by inputting by the input unit 110. The characteristic of the line calculated by the line characteristic calculation unit 132b is stored in the line characteristic file 122.

In step 103-step 111, a process of repeat for each antenna element included in the antenna is executed.

Specifically, in step 104, the simulation result judgment unit 131c judges whether or not the total efficiency $\eta_t$ of the first antenna element (i=1) in the model including the antenna and the line which is obtained by the simulation execution unit 131b is equal to or above the desired standard value.

In a case in which it is judged that $\eta_t$ is equal to or above the desired standard value in step 104 (step 104, "NO"), the antenna design process proceeds to step 111.

In a case in which it is judged that $\eta_t$ is below the desired standard value in step 100 (step 104, "YES"), the antenna design process proceeds to step 105.

In step 105, the display unit 140 displays a tool screen for designing the antenna model including a matching circuit.

FIG. 24 illustrates an example of a display screen of a design tool of the antenna model with a matching circuit.

As illustrated in FIG. 24, the display screen 800 includes an area 810 to display the file name of the antenna characteristic file 121, and an area 820 to display the characteristic of the matching element added to the model including the antenna and the line. In addition, the display screen 800 includes an area 830 to display the calculation result for the antenna model with a matching circuit including the added matching element.

When the file name of the antenna characteristic file 121 for each of the antenna elements included in the antenna is input via the input unit 110, the file name of the antenna characteristic file for each of the input antenna elements is displayed in the area 810. The matching-circuit including antenna-model creation unit 133a imports the antenna impedance, the S parameter, and the radiation efficiency for each frequency stored in each of the input antenna characteristic file 121.

In some embodiments, the antenna characteristics of each antenna element are input individually via the input unit 110. The input antenna characteristics are respectively displayed in the area 810. The matching-circuit including antenna-model creation unit 133a imports the antenna characteristics which are input individually.

The matching-circuit including antenna-model creation unit 133a calculates the desired circuit configuration of the matching circuit connected to each antenna element, based on the imported S parameter of the antenna alone model. In addition, in some embodiments, the matching-circuit including antenna-model creation unit 133a obtains data of the circuit configuration of each matching circuit input via the input unit 110. The circuit configuration of each matching circuit calculated or obtained by the matching-circuit including antenna-model creation unit 133a may also be configured to be displayed on the tool screen by the display unit 140.

The matching-circuit including antenna-model creation unit 133a decides the matching element to constitute each matching circuit that matches the usage condition, according to the calculated or obtained circuit configuration. The usage condition of the matching element is obtained in advance by the matching-circuit including antenna-model creation unit 133a by inputting via the input unit 110.

In some embodiments, the characteristic of the matching element that constitutes each matching circuit is input via the input unit 110, and the input characteristic of the matching element is displayed in the area 820. For example, when the matching element is a capacitor, the capacitance, the Equivalent Series Resistance (ESR), the Equivalent Series Inductance (ESL) are input, and these input characteristics are displayed in the area 820. When the matching element is an inductor, the inductance, the associated capacitance, and the associated resistance are input, and these input characteristics are displayed in the area 820. The matching-circuit including antenna-model creation unit 133a decides the matching element input via the input unit 110 as the matching element that matches the usage condition.

In addition, in some embodiments, the matching-circuit including antenna-model creation unit 133a decides the matching element that matches the usage condition by referring to data of the matching elements stored in the matching element data file 124.

When the type of the matching element is a capacitor, the matching element data file 124 includes data about the matching element name, the manufacturer name, the size, the capacitance, the Equivalent Series Resistance (ESR), the Equivalent Series Inductance (ESL), the withstanding pressure and the price.

A capacitor includes the Equivalent Series Resistance (ESR) being a loss resistance component and the Equivalent Series Inductance (ESL) being a parasitic reactance component other than the capacitance. In the embodiment, the antenna characteristic of the antenna model with a matching circuit is calculated in view of the Equivalent Series Inductance (ESL) and the Equivalent Series Resistance (ESR) in addition to the capacitance of the capacitor. Therefore, data about the Equivalent Series Inductance (ESL) and the Equivalent Series Resistance (ESR) are made to be stored in the matching element data file 124.

When the type of the matching element is an inductor, the matching element data file includes data about the matching element name, the manufacturer name, the size, the inductance, the associated capacitance, the associated resistance, the withstanding pressure, and the price.

An inductor includes the associated resistance being a loss resistance component and the associated capacitance being a parasitic reactance component other than the inductance. In the embodiment, the antenna characteristic of the antenna model with a matching circuit is calculated in view of the associated capacitance and the associated resistance in addition to the inductance of the inductor. Therefore, data about the associated capacitance and the associated resistance are made to be stored in the matching element data file 124.

When deciding the matching element that matches the usage condition by referring to the matching element data file, the matching-circuit including antenna-model creation unit 133a first rearranges the matching element data file 124 in ascending order or descending order about the capacitance or inductance. In addition, when there are matching elements with the same capacitance or inductance, the matching-circuit including antenna-model creation unit 133a makes the rearrangement in ascending order or descending order about the price of the matching elements. Then, the matching-circuit including antenna-model creation unit 133a selects from the matching element data file 124 the matching element whose size and withstanding pressure match the usage conditions of the matching element. When there are matching elements with the same size and withstanding pressure in the matching element data file 124, the matching-circuit including antenna-model creation unit 133a selects a matching element with a small value of the price.

When the matching element to constitute each matching circuit is decided by the matching-circuit including antenna-model creation unit 133a, the type, the capacitance or the inductance, the loss resistance, and the parasitic reactance of the decided matching element are displayed in the area 820.

In some embodiments, when the matching circuit calculated or obtained by the matching-circuit including antenna-model creation unit 133a is a circuit in which the matching element is mounted in parallel to the antenna, the display unit 140 performs display to prompt input of each value of the via length h and the via diameter D connected to the matching element that is mounted in parallel to the antenna.

Each value of the via length h and the via diameter D connected to the matching element that is mounted in parallel to the antenna is input via the input unit 110. The antenna characteristic calculation unit 133b calculates the inductance of the via using each input value of the via length h and the via diameter D. The calculated inductance of the via is added to the reactance of the matching element connected to the via.

The matching-circuit including antenna-model creation unit 133a imports the impedance, the attenuation constant, and the phase constant of the line for each frequency stored in the line characteristic file 122.

The length of each line connected to each antenna element is input via the input unit 110. In some embodiments, the characteristic impedance, the attenuation constant $\alpha$, and the phase constant $\beta$ of the line for each frequency are input via the input unit 110. In addition, in some embodiments, the matching-circuit including antenna-model creation unit 133a imports the characteristic impedance, the attenuation constant, and the phase constant of the line for each frequency stored in the line characteristic file 122.

In step 106, the antenna characteristic calculation unit 133b calculates the antenna characteristic of the antenna model created by the matching-circuit including antenna-model creation unit 133a according to the calculation method described above with reference to FIG. 2-FIG. 7. The antenna characteristic to be calculated includes the S parameter, the radiation efficiency $\eta$, and the total efficiency $\eta_t$. The calculation result by the antenna characteristic calculation unit 133b is stored in the calculation processing data file 123.

In addition, the antenna characteristic calculation unit 133b calculates the power consumption of each of the line and the matching element included in the antenna model with a matching circuit. The calculation result by the antenna characteristic calculation unit 133b is stored in the calculation processing data file 123.

As illustrated in FIG. 24, the S parameter, the radiation efficiency $\eta$, and the total efficiency $\eta_t$ which are calculated by the antenna characteristic calculation unit 133b are displayed in the area 830 of the display screen 800 by display unit 140.

In step 107, the calculation result judgment unit 133c judges whether or not the total efficiency $\eta_t$ calculated by the antenna characteristic calculation unit 133b is equal to or above the desired standard value.

In a case in which it is judged that the total efficiency $\eta_t$ is equal to or above the desired standard value (step 107, "NO"), the antenna design process proceeds to step 111.

In a case in which it is judged that the total efficiency $\eta_t$ is below the desired standard value (step 107, "YES"), the antenna design process proceeds to step 108.

In step 108, the calculation result judgment unit 133c makes the display unit 140 display the power consumption of the matching element that constitute each matching circuit, the power consumption being stored in the calculation processing data file 123. In some embodiments, the calculation result judgment unit 133c makes a printing apparatus (not illustrated in the drawing) connected to the antenna design apparatus 100 print the power consumption of the matching element that constitute each matching circuit.

In addition, in step 108, a process to exchange the matching element that constitute each matching circuit is executed. The detail of the exchange process of the matching element in step 108 is illustrated in FIG. 25.

Figure 25:
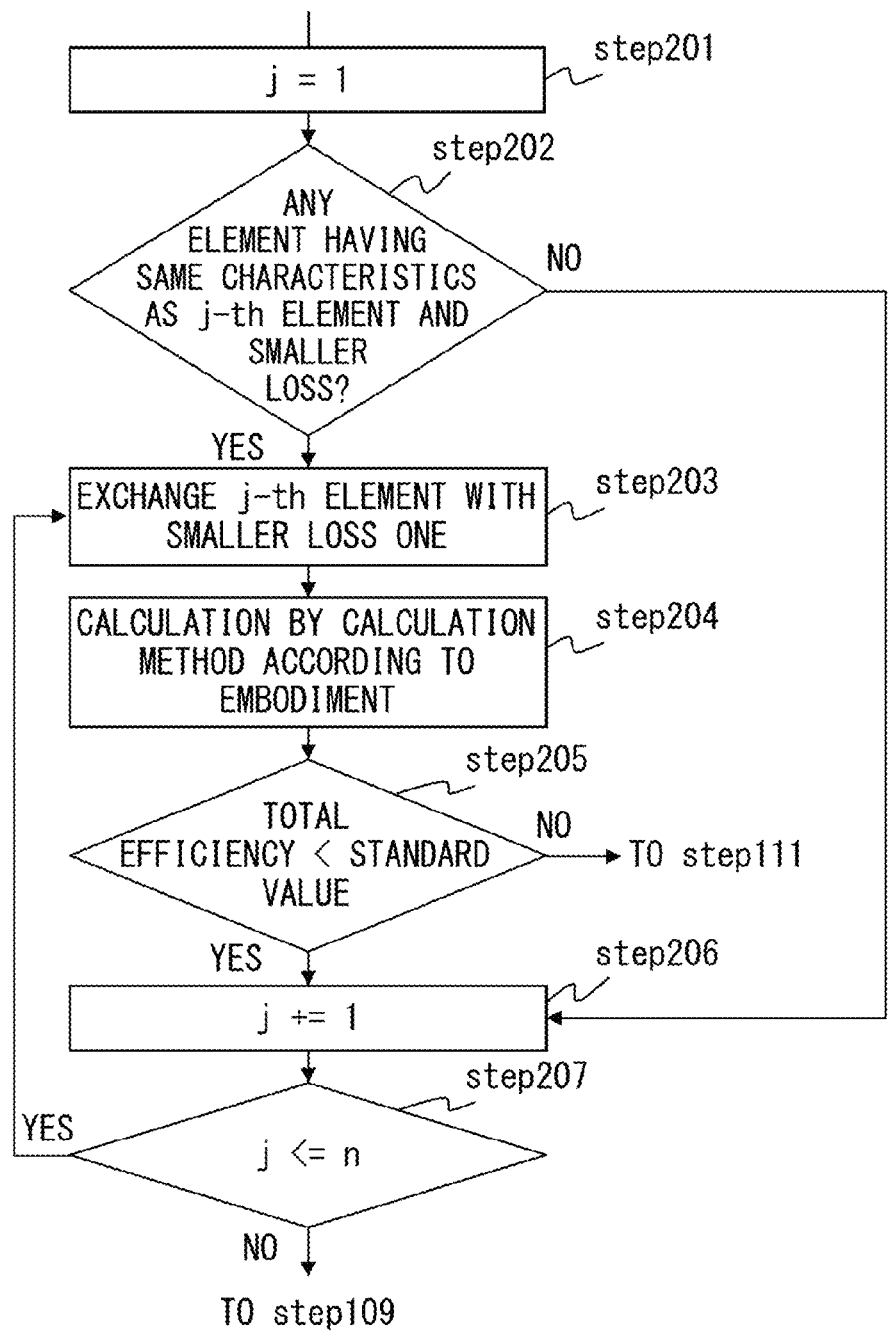
FIG. 25 illustrates an example diagram of an exchange process flow of a matching element.

FIG. 25 illustrates an example diagram of an exchange process flow of a matching element.

In step 201, the calculation result judgment unit 133c rearranges n units (n is an integer being 1 or larger) of all the matching circuits in descending of the power consumption, and assigns matching element numbers from 1 to n to the rearranged matching elements in ascending order. In addition, the calculation result judgment unit 133c sets a count value j of the matching element number to 1.

In step 202, the calculation result judgment unit 133c searches for a matching element having the same capacitance or inductance with that of the matching element of the same j-th matching element number as the count value j, and having a smaller loss resistance than that of the matching element of the j-th matching element number. In some embodiments, the calculation result judgment unit 133c searches for a corresponding matching element from the matching element data file 124.

When a corresponding matching element exists in step 202 ("YES" in step 202), the process proceeds to step 203.

In step 203, the matching-circuit including antenna-model creation unit 133a exchanges the matching element of the j-th matching element number included in the matching circuit to the matching element searched by the calculation result judgment unit 133c.

In step 204, the antenna characteristic calculation unit 133b calculates the antenna characteristic of the antenna model including a matching circuit in which the matching element has been exchanged by the matching-circuit including antenna-model creation unit 133a by the calculation method according to the embodiment.

In step 205, the calculation result judgment unit 133c judges whether or not the total efficiency $\eta_t$ of the antenna model including a matching circuit in which the matching element has been exchanged is equal to or above the desired standard value.

In a case in which it is judged that $\eta_t$ is equal to or above the desired standard value in step 205 (step 205, "NO"), the antenna design process proceeds to step 111 in FIG. 23.

In a case in which it is judged that $\eta_t$ is below the desired standard value in step 205 (step 205, "YES"), the antenna design process proceeds to step 206.

When there is no corresponding matching element in step 202 (step 202, "NO"), the antenna design element proceeds to step 206.

In step 206, the calculation result judgment unit 133c increments the count value j by 1. Then, in step 207, it is judged whether or not the count value j is equal to or below the number of matching elements n of all the matching circuits.

In a case in which it is judged that the count value j is equal to or below the number of the matching elements n that constitute the matching circuit (step 207, "YES"), the antenna design process returns to step 203 and is continued.

In a case in which it is judged that the count value j exceeds the number of the matching elements n that constitute the matching circuit (step 207, "NO"), the antenna design process proceeds to step 109 in FIG. 23.

In step 109 in FIG. 23, the calculation result judgment unit 133c makes the display unit 140 performs display to prompt input whether or not the line length change of the line is possible. Then, the calculation result judgment unit 133c decides whether or not the line length change of the line included in the antenna model with a matching circuit is possible according to the input of whether or not the line length change of the line is possible via the input unit 100.

In a case in which the line length change of the line is not possible in step 109 (step 109, "NO"), the antenna design process proceeds to step 112.

In a case in which the line length change of the line is possible in step 109 (step 109, "YES"), the antenna design process proceeds to step 110.

In step 110, the calculation result judgment unit 133c makes the display unit 140 display the power consumption of each line constituting the antenna model with a matching circuit, the power consumption being stored in the calculation processing data file 123. In some embodiments, the calculation result judgment unit 133c makes a printing apparatus (not illustrated in the drawing) connected to the antenna design apparatus 100 print the power consumption of each line constituting the antenna model with a matching circuit.

In addition, in step 110, a process to change the line length of each line that constitute the antenna model with a matching circuit is executed. The detail of the change process of the line length in step 110 is illustrated in FIG. 26.

Figure 26:
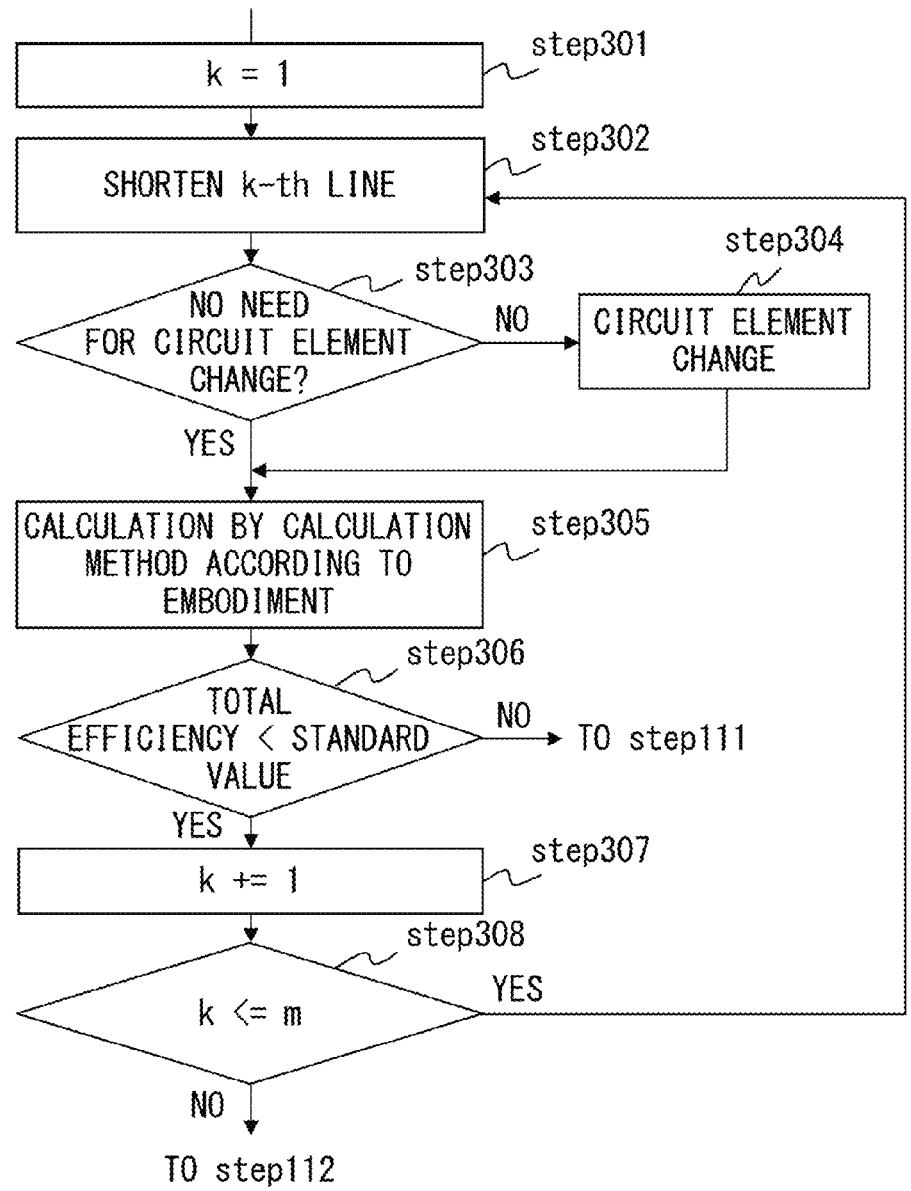
FIG. 26 illustrates an example diagram of a change process flow of the line length of the line.

FIG. 26 illustrates an example diagram of a change process flow of the line length of the line.

In step 301, the calculation result judgment unit 133c rearranges the m lines (m is an integer being 1 or larger) that constitute the antenna model with a matching circuit in descending order of the power consumption, and assigns line numbers from 1 to m to the rearranged lines in ascending order. In addition, the calculation result judgment unit 133c sets the count value k of the line number to 1.

In step 302, the calculation result judgment unit 133c shortens the line length of the line having the same line number as the count number k. The line length changed by the calculation result judgment unit 133c is, for example, the length with which circuit elements connected by the line do not touch each other.

In step 303, the calculation result judgment unit 133c judges whether or not a change of circuit elements connected to the line is needed according to the phase change of the impedance of the line due to the shortening of the line length.

In a case in which it is judged that the change of the circuit elements is not needed in step 303 (step 303, "YES"), the antenna design process proceeds to step 305.

In a case in which it is judged that the change of the circuit elements is needed in step 303 (step 303, "NO"), the antenna design process proceeds to step 304.

In step 304, a change process of circuit elements is performed. The change process of circuit elements executed in step 300 is, for example, the calculation process of the circuit configuration of the matching circuit and the selection process of the matching element by the matching-circuit including antenna-model creation unit 133a as described above.

In step 305, the matching-circuit including antenna-model creation unit 133a re-creates an antenna model with a matching circuit in which the line length has been changed based on the change of the line length in step 302 and the change of circuit elements in step 304. The antenna characteristic calculation unit 133b calculates the antenna characteristic of the antenna model re-created by the matching-circuit including antenna-model creation unit 133a according to the calculation method described above with reference to FIG. 2-FIG. 7.

In step 306, the calculation result judgment unit 133c judges whether or not the total efficiency $\eta_t$ of the antenna model with a matching circuit in which the line length has been changed is equal to or above the desired standard value.

In a case in which it is judged that $\eta_t$ is equal to or above the desired standard value in step 306 (step 306, "NO"), the antenna design process proceeds to step 111 in FIG. 23.

In a case in which it is judged that $\eta_t$ is below the desired standard value in step 306 (step 306, "YES"), the antenna design process proceeds to step 307.

In step 307, the calculation result judgment unit 133c increments the count value k by 1. Then, in step 308, it is judged whether or not the count value k is equal to or below the number of lines m that constitute the antenna model with a matching circuit.

In a case in which it is judged that the count value k is equal to or below the number of lines m (step 308, "YES"), the antenna design process returns to step 302 and the antenna design process is continued.

In a case in which it is judged that the count value j exceeds the number of lines m (step 308, "NO"), the antenna design process proceeds to step 112 in FIG. 23.

In step 111 in FIG. 23, the count value i of the antenna element is incremented by 1. Then, the process of repeating step 104-step 110 for the second antenna element (i=2) is executed.

When the process of repeating for the second antenna element (i=2) is executed, the antenna design process proceeds to step 112 and is terminated.

When it is judged that the total efficiency is equal to or above the standard value for all the antenna elements during the repeating process of step 103-step 111 and the process proceeds to step 112, the test production or production of the antenna is performed based on the antenna model created by the matching-circuit including antenna-model creation unit 133a.

On the other hand, when the process proceeds to step 112 after the process of step 109 and the process proceeds to step 112 after the process of step 308, in some embodiments, the process is returned to step 101, the basic design condition data such as the size and position of the antenna model input by the input unit 110 are changed, and the antenna design process according to the embodiment is executed again. In addition, in some embodiments, the process is returned to step 105, the usage condition of the matching element such as the size of the matching element and the like, and the antenna design process according to the embodiment is executed again.

Meanwhile, the antenna design process flow described above with reference to FIG. 23-FIG. 26 is only an example, and it is not intended to mean that the embodiment is limited to this. For example, it is also possible to add the following change to the antenna design process flow described above.

First, in step 101 of the antenna design process flow, the input unit 110 inputs data about the circuit configuration of the matching circuit as the condition data of the antenna model, in addition to the various data described above.

In step 105, the matching-circuit including antenna-model creation unit 133a creates a model of the matching circuit constituted by a matching element that does not include the parasitic reactance component and the loss resistance component according to the data about the circuit configuration of the matching circuit input by input unit 110. Then, the matching-circuit including antenna-model creation unit 133a makes the simulation execution unit 131b execute a simulation for the created antenna model with a matching circuit, and obtains the optimal circuit constant.

The matching-circuit including antenna-model creation unit 133a decides the matching element constituting the matching circuit according to the circuit constant obtained by the simulation execution unit 131b. In some embodiments, the matching-circuit including antenna-model creation unit 133a decides the matching element by referring to the matching element data file. In addition, in some embodiments, the matching-circuit including antenna-model creation unit 133a decides the matching element based on data of the matching element input via the input unit 110.

In step 106, the antenna characteristic calculation unit 133b calculates the antenna characteristic of the antenna model including a matching circuit which is constituted by the matching element decided by the matching-circuit including antenna-model creation unit 133a according to the calculation method described above.

In addition, in the embodiment described above, the antenna design method executed by the antenna design apparatus 100 is explained. However, the configuration and the processing function that the antenna design apparatus 100 described above has may also be realized by software called an antenna design program. Therefore, a similar antenna design process to the antenna design process executed by the antenna design apparatus 100 may also be realized by a computer that executes the antenna design program.

Figure 27:
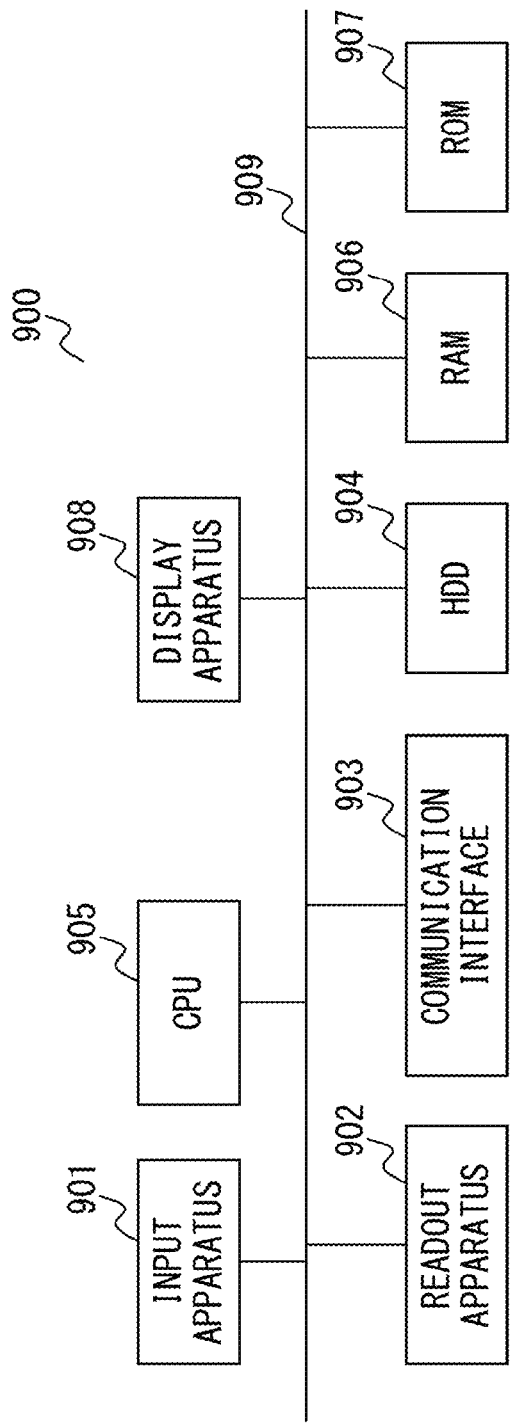
FIG. 27 illustrates a hardware configuration diagram of a computer that executes an antenna design program according to an embodiment.

FIG. 27 illustrates a hardware configuration diagram of a computer that executes an antenna design program according to the embodiment.

As illustrated in FIG. 27, a computer 900 includes an input apparatus 901, a readout apparatus 902, a communication interface 903, a hard disk (HDD) 904, a Central Processing Unit (CPU) 905, a Random Access Memory (RAM) 906, a Read Only Memory (ROM) 907, a display apparatus 908, and a bus 909. The apparatuses 901-908 included in the computer 900 are connected to each other by the bus 909.

The input apparatus 901 is an apparatus that detects the operation done by the user of the computer 900, and is, for example, a mouse and a keyboard.

The readout apparatus 902 is an apparatus that reads out a program and data included in a variable recording medium such as a magnetic disk, an optical disk, and a magnetooptical disk and the like, and is, for example, a Compact Disc/Digital Versatile Disc (CD/DVD) drive. The communication interface 903 is an interface for connecting the computer 900 to a communication network such as a Local Area Network (LAN) and the like. The HDD 904 is a storage apparatus that stores the program and data that the CPU 905 executes.

The antenna design program according to the embodiment is installed in the HDD 904 with the antenna design program recorded on a variable recording medium being read out by the readout apparatus 902. Alternatively, the antenna design program according to the embodiment is installed in the HDD 904 with the antenna design program stored in another computer apparatus (not illustrated in the drawing) being obtained by the computer 900 via the communication interface 903.

The CPU 905 is a processing apparatus that executes the antenna design process according to the embodiment by reading out the antenna design program from the HDD 904 to the RAM 906 and executing the antenna design program.

The RAM 906 is a memory that stores the intermediate result of the execution result of the antenna design program read out from the HDD 904. The ROM 907 is a read-only memory that stores constant data and the like.

The display apparatus 908 is an apparatus that displays the processing result of the CPU 905 and the like, and is, for example, an Liquid crystal display apparatus.

As descried above, the antenna characteristic in view of the loss in the matching element and the interaction between antenna elements is calculated by an analytical method using the characteristic of the antenna alone and the characteristic of the matching element. In addition, the antenna characteristic in view of the loss in the line in addition to the loss in the matching element and the interaction between antenna elements is calculated by an analytical method using the characteristic of the antenna alone, the characteristic of the matching element, and the characteristic of the line.

Therefore, according to the antenna characteristic calculation method according to the embodiment, compared with the case of obtaining by a simulation, the antenna characteristic in view of the interaction between antenna elements and the loss in circuit elements as described above may be obtained in a short period of time, and the desired antenna may be designed in a speedy and efficient manner.

In addition, in the embodiment, the circuit elements included in the antenna model are changed as needed during the antenna design process, so that the total efficiency of the antenna model in view of the loss in the matching element and the interaction between antenna elements satisfies the desired standard value. In addition, in the embodiment, the circuit elements included in the antenna model are changed as needed during the antenna design process, so that the total efficiency of the antenna model in view of the loss in the matching element, the loss in the line, and the interaction between antenna elements satisfies the desired standard value.

Therefore, according the antenna characteristic calculation method according to the embodiment, the antenna design process in view of the interaction between antenna elements and the loss in circuit elements may be executed efficiently.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An antenna design method executed by a computer, the antenna design method comprising:
    creating an antenna model including an antenna which includes a plurality of antenna elements and matching circuits which are respectively connected to the plurality of antenna elements and which includes a matching element including a parasitic reactance and a loss resistance;
    obtaining a characteristic of the antenna and a characteristic of the matching element;
    calculating a total efficiency of the antenna model using the obtained characteristic of the antenna and the obtained characteristic of the matching element, the total efficiency of the antenna model being a ratio of a total input power from a wave source to a radiation power from the antenna;
    judging whether or not the calculated total efficiency of the antenna model satisfies a desired total efficiency of the antenna; and
    displaying result of the judgment.

2. The antenna design method according to claim 1, wherein
    the characteristic of the antenna includes an S parameter of the antenna, the characteristic of the matching element includes an impedance of the matching element, and the characteristic of the antenna includes an S parameter of the antenna model, and
    the computer calculates an F parameter of the antenna using the S parameter of the antenna, calculates an F parameter of the matching circuit using the impedance of the matching element, and calculates the S parameter of the antenna model using the calculated F parameter of the antenna and the F parameter of the matching circuit.

3. The antenna design method according to claim 2, wherein
    the computer calculates the total efficiency of the antenna model by assuming that a ratio of a sum of a radiation efficiency of the antenna and a loss in the antenna to the radiation efficiency is equal between a model of the antenna alone and the antenna model.

4. The antenna design method according to claim 1, wherein
    when the matching element is mounted in parallel to the antenna, the computer calculates an inductance of a via connected to the matching element, and calculates the total efficiency of the antenna model using the calculated inductance of the via.

5. The antenna design method according to claim 1, wherein
    the computer selects the matching element comprised in the matching circuit by referring to a matching element data file including data about a usage condition of the matching element.

6. The antenna design method according to claim 1, wherein
    when the computer judges that the total efficiency of the antenna model does not satisfy the desired total efficiency of the antenna, the computer displays a power consumption of the matching element.

7. The antenna design method according to claim 1, wherein
    the computer
    creates an antenna model including lines respectively connected to the plurality of antenna elements in addition to the antenna and the matching circuit;
    obtains characteristics of the lines; and
    calculates the total efficiency of the antenna model using the obtained characteristics of the lines in addition to the obtained characteristic of the antenna and the obtained characteristic of the matching element.

8. The antenna design method according to claim 1, wherein
    when it is judged that the calculated total efficiency does not satisfy the desired total efficiency of the antenna, the computer:
    replaces one of the plurality of matching elements included in the antenna with another matching element, an element value of each of the another matching element and the one of the plurality of matching elements being the same and a loss resistance of the another matching element being smaller than the one of the plurality of matching elements; and
    performs the creating, the obtaining, the calculating, the judging and the displaying again.

9. An antenna design apparatus comprising:
    a processor which performs a process including:
        creating an antenna model including an antenna which includes a plurality of antenna elements and matching circuits which are respectively connected to the plurality of antenna elements and which includes a matching element including a parasitic reactance and a loss resistance;
        obtaining a characteristic of the antenna and a characteristic of the matching element;
        calculating a total efficiency of the antenna model using the obtained characteristic of the antenna and the obtained characteristic of the matching element, the total efficiency of the antenna model being a ratio of a total input power from a wave source to a radiation power from the antenna; and
        judging whether or not the calculated total efficiency of the antenna model satisfies a desired total efficiency of the antenna, and
    a display which displays result of the judgment by the processor.

10. The antenna design apparatus according to claim 9, wherein
    when it is judged that the calculated total efficiency does not satisfy the desired total efficiency of the antenna, the processor:
    replaces one of the plurality of matching elements included in the antenna with another matching element, an element value of each of the another matching element and the one of the plurality of matching elements being the same and a loss resistance of the another matching element being smaller than the one of the plurality of matching elements; and
    performs the creating, the obtaining, the calculating, and the judging again, and
    the display displays result of a retry of the judgement by the processor.

11. A non-transitory computer-readable recording medium having stored therein an antenna design program for causing a computer to execute processes comprising:
    creating an antenna model including an antenna which includes a plurality of antenna elements and matching circuits which are respectively connected to the plurality of antenna elements and which includes a matching element including a parasitic reactance and a loss resistance;

obtaining a characteristic of the antenna and a characteristic of the matching element;

calculating a total efficiency of the antenna model using the obtained characteristic of the antenna and the obtained characteristic of the matching element, the total efficiency of the antenna model being a ratio of a total input power from a wave source to a radiation power from the antenna;

judging whether or not the calculated total efficiency of the antenna model satisfies a desired total efficiency of the antenna; and displaying result of the judgment.

12. The non-transitory computer-readable recording medium according to claim 11, wherein when it is judged that the calculated total efficiency does not satisfy the desired total efficiency of the antenna, the antenna design program causes the computer to execute processes including:

replacing one of the plurality of matching elements included in the antenna with another matching element, an element value of each of the another matching element and the one of the plurality of matching elements being the same and a loss resistance of the another matching element being smaller than the one of the plurality of matching elements; and performing the creating, the obtaining, the calculating, the judging and the displaying again.

* * * * *